United States Patent
Cai et al.

(10) Patent No.: US 10,197,706 B1
(45) Date of Patent: Feb. 5, 2019

(54) SYSTEM AND METHOD FOR SUB-SEASONAL FORECASTS OF EXTREME WEATHER EVENTS IN WINTER

(71) Applicant: The Florida State University Research Foundation, Inc., Tallahassee, FL (US)

(72) Inventors: Ming Cai, Tallahassee, FL (US); Yueyue Yu, Tallahassee, FL (US)

(73) Assignee: The Florida State University Research Foundation, Inc., Tallahassee, FL (US)

(*) Notice: Subject to any disclaimer, the term of this patent is extended or adjusted under 35 U.S.C. 154(b) by 19 days.

(21) Appl. No.: 15/450,897

(22) Filed: Mar. 6, 2017

Related U.S. Application Data

(60) Provisional application No. 62/303,823, filed on Mar. 4, 2016.

(51) Int. Cl.
 *G01W 1/00* (2006.01)
 *G06F 19/00* (2018.01)
 *G01W 1/10* (2006.01)

(52) U.S. Cl.
 CPC .................................... *G01W 1/10* (2013.01)

(58) Field of Classification Search
 CPC ....................................................... G01W 1/10
 USPC ............................................................ 702/3
 See application file for complete search history.

(56) References Cited

U.S. PATENT DOCUMENTS

2013/0024118 A1\* 1/2013 Gershunov ............ G01W 1/10
702/3

OTHER PUBLICATIONS

Cai et al., "Feeling the pulse of the stratosphere: An emerging opportunity for predicting continental-scale cold air outbreaks one month in advance", Nov. 2015.\*

Baldwin et al., Stratospheric memory and skill of extended-range weather forecasts. Science. 2003. vol. 301: 636-640.

Hamill et al., Ensemble reforecasting: Improving medium-range forecast skill using retrospective forecasts. Mon. Wea. Rev., 2004. vol. 132, 1434-1447.

Hardiman et al., Improved predictability of the troposphere using stratospheric final warmings. J. Geophys. Res. 2011. vol. 116: D18113.

(Continued)

*Primary Examiner* — John H Le
(74) *Attorney, Agent, or Firm* — Molly L. Sauter; Smith & Hopen, P.A.

(57) ABSTRACT

A system and method employing a hybrid method for predicting sub-seasonal forecasts of winter storms and cold air outbreaks (CAOs). In various embodiments, the method includes, deriving a lead-time series of forecasted indices describing a state of stratospheric mass circulation from a plurality of forecasts generated by an operational numerical model for seasonal weather forecasts, detecting one or more PULSE events in the lead-time series of forecasted indices describing a state of stratospheric mass circulation to determine a state of the stratospheric mass circulation during the detected PULSE events and generating a sub-seasonal forecast of winter snowstorms and cold air outbreaks (CAOs) by linking the state of stratospheric mass circulation during the detected PULSE events to one or more maps of surface temperature and wintery precipitation based on historical observation data.

24 Claims, 12 Drawing Sheets
(12 of 12 Drawing Sheet(s) Filed in Color)

(56) References Cited

OTHER PUBLICATIONS

Kirtman et al., The North American multimodel ensemble: Phase-1 seasonal-to-interannual prediction; Phase-2 toward developing intraseasonal prediction. Bull. Amer. Meteor. Soc., 2014. vol. 95: 585-601.

Kuroda. Role of the stratosphere on the predictability of medium-range weather forecast: A case study of winter 2003-2004. Geophys. Res. Lett., 2008. vol. 35: L19701.

Kuroda., High initial-time sensitivity of medium-range forecasting observed for a stratospheric sudden warming. Geophys. Res. Lett., 2010. vol. 37: L16804.

Marshall and Scaife. Improved predictability of stratospheric sudden warming events in an atmospheric general circulation model with enhanced stratospheric resolution. J. Geophys. Res. 2010. Volume 115: D16114.

Smith et al., What is the current state of scientific knowledge with regard to seasonal and decadal forecasting? Environ. Res. Lett., 2012. vol. 7: 015602.

\* cited by examiner

SYSTEM AND METHOD FOR SUB-SEASONAL FORECASTS OF EXTREME WEATHER EVENTS IN WINTER

FIELD OF INVENTION

This invention relates to the prediction of extreme weather events. Specifically, the invention provides a method and model of providing sub-seasonal forecasts of winter storms and cold air outbreaks 14-50 days in advance.

BACKGROUND OF THE INVENTION

Extreme weather events such as winter snowstorms and cold air outbreaks (CAO) pose great threats to human life and to the socioeconomic well being of modern society. Such extreme weather events have caused school/business closure, costly road/highway snow removal and deicing, loss of agricultural products and mass flight cancellations. Accurate forecasts of high impact weather at a lead time of one month or longer are needed for business planners, decision makers at all levels of local, state, and federal government agencies, and energy producers/consumers and energy traders. Extreme weather events such as CAOs create a temporary (which can last several weeks) supply-demand imbalance or high-demand period for commodities such as natural gas and electricity. Despite 50 years of history of numerical weather predictions, the existing numerical weather prediction models still cannot provide useful information about individual winter storms and their associated CAOs at a lead time beyond two weeks. This two-week predictability limit of numerical weather predictions is due to the inherent nonlinear dynamics constraints characterized by the chaotic nature of the atmospheric motions, or the so-called "butterfly effect". Such a limit severely compromises the ability to plan ahead and devise an optimal strategy to minimize the adverse impacts of winter snowstorms and CAOs.

Weather forecasts having a lead time of 14-60 days (referred to as the sub-seasonal range) are regarded as the most challenging problem in the business of weather forecasts. Sub-seasonal forecasts issued by most operational forecast centers, such as Climate Prediction Center (CPC) of the U.S. National Weather Service and the UK Met Office, are made by a combination of empirical and dynamical prediction tools. Dynamical tools derive forecasts by integrating global atmospheric models with prescribed ocean surface temperature or coupled ocean-atmosphere global models. Currently, the dynamical forecasts used by CPC for sub-seasonal forecasts are derived from the Climate Forecast System Version 2 (CFSv2) model. The CFSv2 forecasts are made 4 times a day. Each forecast is made by integrating the CFSv2 model starting from the observed states of the ocean, land surface, and atmosphere at the initial time and ending in 9 months later. There are 3 additional perturbed runs at 0 UTC (Universal Time Coordinated) out to one season and 3 additional perturbed runs at 6, 12 and 18 UTC out to 45 days. Despite the fact that CFSv2 model outputs are available at least once per day from the initial time to 9 months after, forecasters rarely use the information derived from daily forecast outputs to predict weather at a lead time of longer than 2 weeks when the skill of forecasts for individual weather events degrades significantly. The only advisory information provided to stakeholders is the monthly/seasonal average temperature and rainfall anomalies, without concerning the timing information of individual weather events.

Accordingly, what is needed in the art is a system and method for predicting extreme weather events which allows for a lead time of greater than two weeks prior to the event.

The prior art empirical models have been derived purely from statistics analysis that either empirically predict dominant climate variability modes or relate particular phases of these modes to monthly and/or seasonal mean anomalies via their statistical relationships. The empirical models used in CPC include canonical correlation analysis, optimum climate normal, regression tool, and ensemble canonical correlation analysis. One of CPC's empirical forecast tools, used only during ENSO episodes, is the ENSO composites, representing historical teleconnections over the United States for El Nino or La Nina years. Another empirical forecast tool is Maddan-Julian Oscillation (MJO) composites. A hybrid paradigm using the phase information of ENSO/MJO phase model has been developed and put into practice in the CPC's experimental week 3-4 outlook. Prediction skills for the map of surface air temperature are improved by conditioned warm and cold phases of ENSO and strong MJO, but for periods without large sea surface temperature anomalies (e.g., non ENSO years, weak and transition phases of MJO), large internal variability makes the forecasts of the "forced" anomalies indecisive.

Other dominant recurring patterns in the tropospheric extratropics, such as the Arctic Oscillation (AO), the North Atlantic Oscillation (NAO), the Pacific North-American Oscillation (PNA), which are closely related with the surface weather regimes, cannot be predicted at a lead time from sub-seasonal to seasonal (S2S) range, though the prediction skills at seasonal and longer time scales have been significantly improved in models with prescribed ocean surface temperature or in coupled ocean-atmosphere global models and thus the predictability of those patterns can only help improve seasonal forecasts of mean surface temperature.

Stratospheric circulation anomalies and tropical forcing have been found to be promising precursors to extreme cold events in mid-latitudes. Extreme cold events in eastern North America, northern Europe, and eastern Asia tend to take place more frequently in the period of 1-2 months after a weaker stratospheric polar vortex. It has also been found that cold temperature anomalies tend to occur over the southeastern United States in 1-2 weeks after the peak days of weak vortex events, whereas cold anomalies occur over Eurasia at the inception of weak vortex events. The temperature anomaly patterns associated with different types of extreme weak polar vortex events have been further shown and it has been reported that cold temperature anomalies tend to take place over the regions underneath the intrusion of the stratospheric air into the troposphere (or tropopause foldings). The easterly phase of the Quasi-Biannual-Oscillation (QBO) in the equatorial stratosphere is favorable for below-normal winter mean temperature over most of the two continents. The warm phase of ENSO events favors cold anomalies in the southeastern United States whereas the MJO-associated convection located over the Indian Ocean favors more extreme cold air surge events in East Asia in winter.

The stratospheric connection to the AO and the associated extreme weather events have been recognized as a new opportunity for sub-seasonal climate predictions in winter seasons since the stratospheric signal provides a long lead information (0-60 days) to anomalous surface weather regimes. With more satellite data in the stratosphere to assimilate and increased vertical resolution, the capability is now available to use numerical weather prediction (NWP) models as an initial value problem for stratospheric forecasts in the extratropics. A useful skill in the sub-seasonal range has been found in predicting extreme polar vortex events and zonal mean temperature, geopotential height, and wind anomalies. The findings of these studies indicate that the useful skill for sub-seasonal forecasts in extratropical stratosphere is due to the models' ability to retain amplitude of planetary waves throughout the sub-seasonal range, despite that the models may not be able to predict the exact locations of planetary waves and their spatial scales beyond the 2-week range.

The conventional wisdom is that the stratosphere is more predictable than the troposphere because of its longer persistence time scale from the dominance of the quasi-stationary planetary scale Rossby waves over the fast moving synoptic scale waves. However, the long persistency does not necessarily imply that a dynamical model would have to have higher prediction skill in both absolute term and in reference to persistent forecasts, although it may yield a higher prediction skill for persistent forecasts. For example, numerical model forecasts in spring seasons have a higher prediction skill in the absolute term for polar stratospheric anomalies than that for equatorial stratospheric anomalies, although the latter has much longer persistent time scale than the former. In reference to persistent forecasts, operational models are much more skillful over the extratropical stratosphere than over the equatorial stratosphere. In this sense, the prediction skill of a dynamical model is not always related to the persistency. Furthermore, it has been shown that for stratospheric sudden warming events and for everyday cases, a numerical model actually has a higher skill in predicting zonal mean flow anomalies than quasi-stationary wave anomalies. Therefore, the lack of synoptic-scale waves in the extratropical stratosphere, which contributes to the relatively long persistency in the extratropical stratosphere in comparison with the troposphere below, is not the most essential factor why a numerical model would have a higher skill there. In addition, the longer radiative cooling time scale in the stratosphere could help to explain why it would be easier to predict the recovery of stratospheric polar vortex. However, it cannot explain why the onset of stratospheric warming events is equally predictable. These examples seem to support the conjecture that if a numerical model has good skill for stratospheric predictions beyond the inherent 2-week predictability limit for the troposphere, it cannot be just due to the relatively long persistence time scale alone.

Evidence has been provided that the prediction skill of tropospheric anomalies by operational models depends on the initial conditions in the stratosphere. Model forecasts for monthly mean tropospheric anomalies have significantly greater skill in the months after stratospheric sudden warming events. As to sub-seasonal forecasts, it has been suggested that the skill improvement in the sub-seasonal range depends on the initial day of the forecast relative to the onset date of stratospheric sudden warming events. The skill dependency on the initial conditions in the stratosphere suggests that the ability of operational models to capture the coupling information between stratospheric and tropospheric anomalies allows the stratospheric variability with longer predictability limit to enhance the forecast skills of troposphere at the sub-seasonal range. However, such skill improvement at the sub-seasonal range for troposphere is not significant in the absence of large amplitude stratospheric anomalies.

As reported in the literature, many stratospheric circulation indices, such as the stratospheric northern annular mode (NAM), zonal mean zonal wind surrounding the polar vortex, polar vortex oscillation, eddy poleward heat flux (or the vertical component of the Eliassen-Palm flux), and stream function of the residual circulation inferred from the downward control principle, may bear long lead precursor information (0-60 days) for surface temperature anomalies. Such long lead information has been utilized in statistical models for predicting monthly or seasonal mean surface temperature anomalies, but not for sub-seasonal forecasts of individual CAOs in a real time (or operational) setting yet.

The work of others in the field have documented the existence of the global meridional mass circulation system that connects the tropics to the poles and the troposphere to the stratosphere via the poleward warm air branch in the upper troposphere (as well as the winter hemisphere's stratosphere) and the equatorward cold branch in the lower troposphere. It has been postulated that the poleward propagating positive stratospheric temperature anomalies are associated with a stronger warm air branch of the meridional mass circulation, and vice versa. The negative phase of stratospheric NAM events is associated with a stronger poleward mass circulation whereas the positive phase is associated with a weaker circulation. Because the poleward propagation in the upper stratosphere tends to be ahead of that in the lower stratosphere, there exists a downward propagation of stratospheric anomalies of both signs associated with stratospheric NAM events.

Recently, two climatological mean routes or main streams of cold air from the polar region to lower latitudes within the cold air branch of the meridional mass circulation have been identified, namely the "East Asian stream" and the "North American stream". The "East Asian stream" intensifies over the northern part of Eurasia, while flowing eastward. It then turns southeastward toward East Asia via Siberia and dissipates over the western North Pacific Ocean. The "North American stream" intensifies over the Arctic Ocean and moves toward the East Coast of North America via Hudson Bay and dissipates over the western North Atlantic Ocean. A comprehensive isentropic diagnosis of East Asian CAOs within the cold air branch of the meridional mass circulation has been previously conducted. It has been shown that the timings of CAOs in mid-latitudes are associated with the strengthening of equatorward cold air mass transport in the lower troposphere and the latter is nearly synchronized with the poleward warm air mass transport in the upper atmosphere (including the stratosphere) into the polar region. These results show that there exist two dominant geographical patterns of temperature anomalies, which tend to occur during the cold air discharge period (or 1-10 days after a stronger mass circulation across the polar circle). One represents cold anomalies mainly in the midlatitudes of both North America and Eurasia, and the other represents cold anomalies mainly over only one of the two continents accompanied with abnormal warmth over the other continent. The existence of such robust relationship between CAO events and the meridional mass transport in upper levels is because the variability of meridional mass transport of cold and warm air and corresponding variability of surface weather systems that are responsible for CAOs is linked to the strengthening/weakening of the poleward warm air mass transport in the upper atmosphere. They further show that the meridional mass circulation in the stratosphere, which is part of the poleward warm air branch, tends to be in phase with the total poleward warm air mass transport above the upper troposphere, with a time lag of few days. This indicates that the poleward mass transport into the polar region in both the upper troposphere and the stratosphere is linked to the cold air activities near surface in boreal winter. In addition, the variability of the annular modes (e.g., NAM and AO), which are directly related with the surface weather regime, can be physically explained and numerically accounted for from the atmospheric mass circulation variation.

The mechanism for the simultaneous poleward mass flux in upper isentropic layers and equatorward mass flux below in the extratropics has been uniquely attributed to the dominance of westward tilted baroclinic waves. Due to hydrostatic and (quasi) geostrophic balance, westward tilted baroclinic waves always have a net poleward mass transport in upper levels and equatorward mass transport in lower levels. Intensification of westward tilted waves results in a near-simultaneous increase in both the poleward mass transport into the polar region aloft and the equatorward discharge of the cold polar air mass in the lower troposphere, responsible for CAOs in mid-latitudes. Deep and large-amplitude baroclinic waves are capable of driving a strong meridional mass circulation that is connected to the stratosphere. The extra air mass brought to the polar region by a stronger poleward mass circulation contributes to a rising of the surface pressure over the Arctic before the cold air in the lower polar troposphere is carried out by a stronger equatorward cold air branch. This explains why the AO or tropospheric NAM tends to be nearly in phase with the lower stratospheric NAM. Therefore, the stronger poleward mass transport in the extratropical stratosphere can be a robust indicator of the equatorward mass transport out of the polar region in the lower troposphere. This is the basis for the existence of the physical causal relationship between the mass circulation in the stratosphere and CAOs.

SUMMARY OF INVENTION

In various embodiments, the present invention provides a system and method for the generation of sub-seasonal forecasts of winter storms and cold air outbreaks (CAOs).

In one embodiment, the present invention provide a method for generating sub-seasonal forecasts of winter snowstorms and cold air outbreaks (CAOs), which includes, receiving, by at least one computing device, a plurality of forecasts generated by an operational numerical model for seasonal weather forecasts. The method further includes, deriving a lead-time series of a set of forecasted indices describing a state of stratospheric mass circulation from the plurality of forecasts generated by an operational numerical model for seasonal weather forecasts. The method further includes, detecting a timing of occurrence and associated intensity of one or more PULSE events in the lead-time series of the set of forecasted indices describing the state of stratospheric mass circulation to determine a model forecasted state of the stratospheric mass circulation during the detected PULSE events. The method further includes correcting a model forecast bias of the model forecasted state of the stratospheric mass circulation during the detected PULSE events to generate a corrected model forecasted state of the stratospheric mass circulation during the detected PULSE events. The method further includes, constructing a statistical model linking the corrected model forecasted state of the stratospheric mass circulation during the detected PULSE events to surface temperature and wintery precipitation based on historical observation data and generating a sub-seasonal forecast of winter snowstorms and cold air outbreaks (CAOs) by applying the corrected model forecasted state of the stratospheric mass circulation during the detected PULSE events to the statistical model.

In a particular embodiment, the operational numerical model for seasonal weather predictions can be any of the operational forecast models, such as the second version of the NOAA (National Oceanic and Atmospheric Administration) Climate Forecast System (CFSv2).

In a specific embodiment, the sub-seasonal forecast is at a forecast range between about 14 days and about 50 days.

In an additional embodiment, the present invention provides a computer system for generating sub-seasonal forecasts of winter snowstorms and cold air outbreaks (CAOs). In various embodiments, the system includes one or more of a central processing unit (CPU), a computer readable memory, a computer readable storage medium and one or more program instructions. The program operations are operable for receiving a plurality of forecasts generated by an operational numerical model for seasonal weather forecasts. The program operations are further operable for deriving a lead-time series of a set of forecasted indices describing a state of stratospheric mass circulation from the plurality of forecasts generated by an operational numerical model for seasonal weather forecasts. The program operations are further operable for detecting a timing of occurrence and associated intensity of one or more PULSE events in the lead-time series of the set of forecasted indices describing the state of stratospheric mass circulation to determine a model forecasted state of the stratospheric mass circulation during the detected PULSE events. The program operations are further operable for correcting a model forecast bias of the model forecasted state of the stratospheric mass circulation during the detected PULSE events to generate a corrected model forecasted state of the stratospheric mass circulation during the detected PULSE events. The program operations are further operable for constructing a statistical model linking the corrected model forecasted state of the stratospheric mass circulation during the detected PULSE events to surface temperature and wintery precipitation based on historical observation data and for generating a sub-seasonal forecast of winter snowstorms and cold air outbreaks (CAOs) by applying the corrected model forecasted state of the stratospheric mass circulation during the detected PULSE events to the statistical model.

In an additional embodiment, the present invention provides a computer program product for generating sub-seasonal forecasts of winter snowstorms and cold air outbreaks (CAOs), the computer program product comprising, a computer-readable medium having non-transitory program code recorded thereon. The computer program product includes program code operable to receive a plurality of forecasts generated by an operational numerical model for seasonal weather forecasts. The computer program product is also operable to derive a lead-time series of a set of forecasted indices describing a state of stratospheric mass circulation from the plurality of forecasts generated by an operational numerical model for seasonal weather forecasts. The computer program product is also operable to detect a timing of occurrence and associated intensity of one or more PULSE events in the lead-time series of the set of forecasted indices describing the state of stratospheric mass circulation to determine a model forecasted state of the stratospheric mass circulation during the detected PULSE events. The computer program product is also operable to correct a model forecast bias of the model forecasted state of the stratospheric mass circulation during the detected PULSE events to generate a corrected model forecasted state of the stratospheric mass circulation during the detected PULSE events. The computer program product is also operable to construct a statistical model linking the corrected model forecasted state of the stratospheric mass circulation during the detected PULSE events to surface temperature and wintery precipitation based on historical observation data and to generate a sub-seasonal forecast of winter snowstorms and cold air outbreaks (CAOs) by applying the corrected model forecasted state of the stratospheric mass circulation during the detected PULSE events to the statistical model.

Accordingly, the present invention provides a system and method for predicting extreme weather events, such as winter storms and cold air outbreaks (CAOs) which allows for a lead time of greater than two weeks prior to the event.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which.

DETAILED DESCRIPTION OF THE INVENTION

In the following detailed description of the preferred embodiments, reference is made to the accompanying drawings, which form a part hereof, and within which are shown by way of illustration specific embodiments by which the invention may be practiced. It is to be understood that other embodiments by which the invention may be practiced. It is to be understood that other embodiments may be utilized and structural changes may be made without departing from the scope of the invention.

In various embodiments, the present invention provides a hybrid model for predicting the timing of high probabilities for occurrence of winter snowstorms and CAOs, as well as their intensity and spatial patterns/pathways at the sub-seasonal range (14-50 days). The hybrid model 100 comprises three core components 105, 110, 115 as illustrated in FIG. 1.

Figure 1:
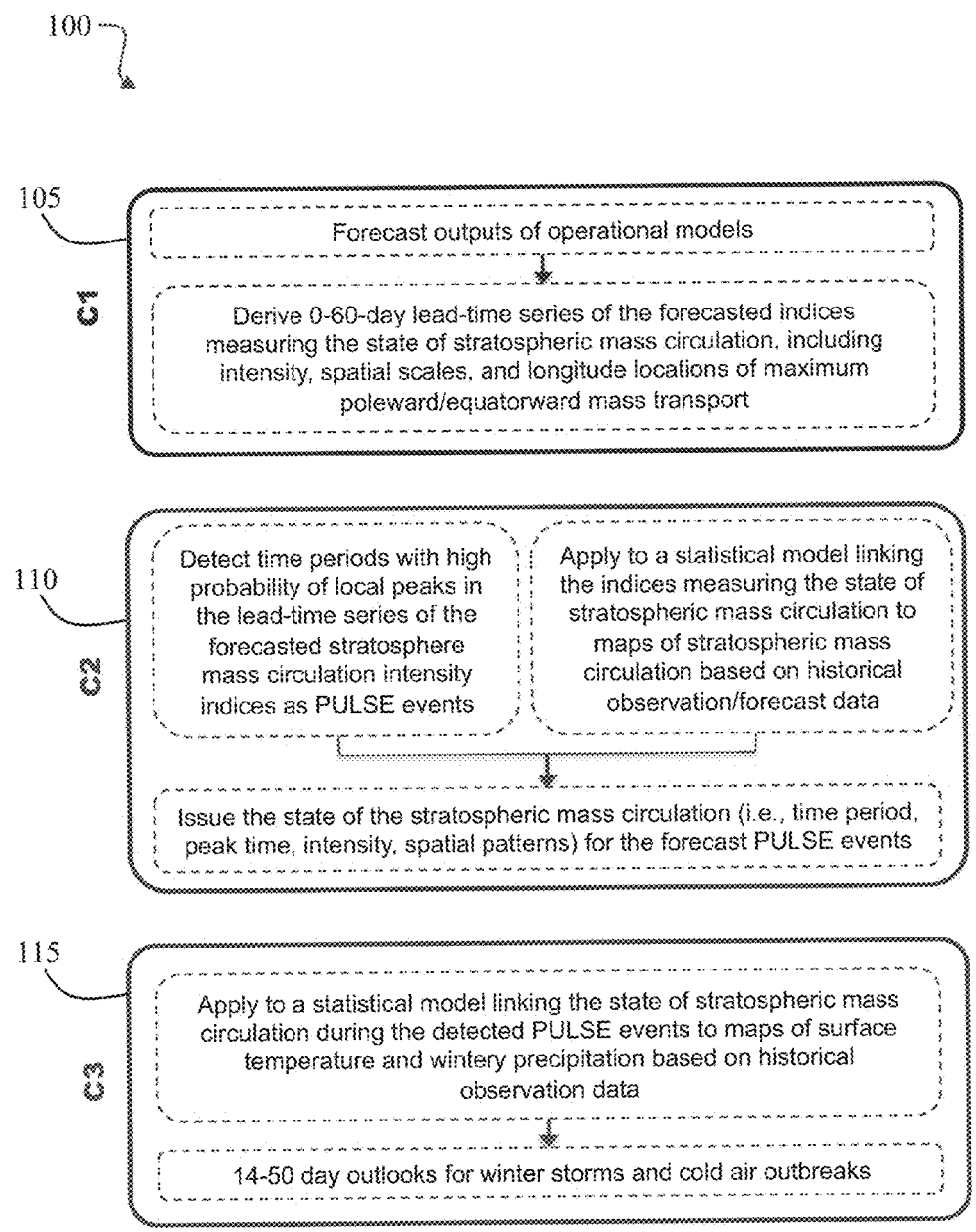
FIG. 1 is a schematic diagram for the overview of the three core components of the hybrid model for sub-seasonal forecasts of winter storms and CAOs, the relationships among the three core components, and their mode of operation, in accordance with an embodiment of the present invention.

As shown with reference to FIG. 1, in a first core component 105 of the method of the present invention 100, the temporal evolution of the state of the stratospheric mass circulation in the extratropics can be adequately described by a handful of indices measuring its intensity, spatial scales, the total amount and longitude locations of maximum values of poleward and equatorward mass transport. Operational numerical coupled models, such as the NOAA CFSv2 model, are capable of providing useful information about future values of these indices at the sub-seasonal time range.

In a second core component 110 of the method of the present invention 100, it is shown that the useful skill in predicting future values of these indices by operational numerical models can be significantly elevated to a nearly perfect skill by detecting the timing of high probability of their local peaks (referred to as pulses in the stratospheric mass circulation and abbreviated as PULSEs), amplitude, and duration from a large member of ensemble forecasts. The spatial patterns of the stratospheric meridional mass fluxes can be further derived from those indices measuring the state of stratospheric mass circulation, based on a robust diagnostic relationship between these indices and maps of stratospheric mass circulation in the historical data of both observations and forecasts, using statistical analysis methods, such as singular vector decomposition, canonical correlation analysis, and constructed analogue.

In a third core component 115 of the method of the present invention 100, it is shown that there exist robust diagnostic relationships that allow for the inference of the timing of high probabilities for occurrence of winter snowstorms and CAOs, their spatial patterns and pathways, and their intensity from the timing of high probability of PULSEs, and their intensity/duration and spatial patterns.

An overview of the core components of the hybrid model 100 for sub-seasonal forecasts of winter storms and CAOs are summarized in FIG. 1. The first core component 105 provides the temporal lead information of forecasts for these indices that describe the state of the stratospheric mass circulation, including intensity, spatial scales, and longitude locations of poleward/equatorward mass transport at lead times of 0-60 days in advance. Such temporal lead information comes from dynamics/physics based state-of-the-art operational models, which is the sole source of the temporal lead information of the hybrid model for sub-seasonal forecasts of winter snowstorms and CAOs. The specific procedures of the first core component 105 are shown in more detail in FIG. 2.

Due to nonlinear chaotic nature of the atmospheric motions, forecasts made by the same operational numerical models for the same verification time but at different lead times and from individual ensemble members still contain a large degree of uncertainties when the forecast lead time is longer than two weeks. The second core component 110 of the present invention essentially is a filtering technique that effectively filters out "noises" or uncertainties contained in the forecasts at the sub-seasonal range and enables the identification of the most robust and consistent temporal lead information about these stratospheric mass circulation indices from a large number of ensemble forecasts. In other words, the main functionality of the second core component 110 is to refine the temporal lead information at the sub-seasonal range by detecting the timing and duration of PULSE events, to correct the systematic error in models' forecasts of the intensity of PULSEs, and to construct the associated spatial patterns of stratospheric meridional mass transport, from the raw forecasts of the stratospheric indices derived in the first core component 105, as shown with reference to FIG. 3. This second core component 110 helps to ensure that the temporal lead information for sub-seasonal forecasts is more accurate and robust and the useful skills of forecasts for the PULSEs and the corresponding stratospheric mass circulation can be extracted to the maximum extent.

Figure 4:
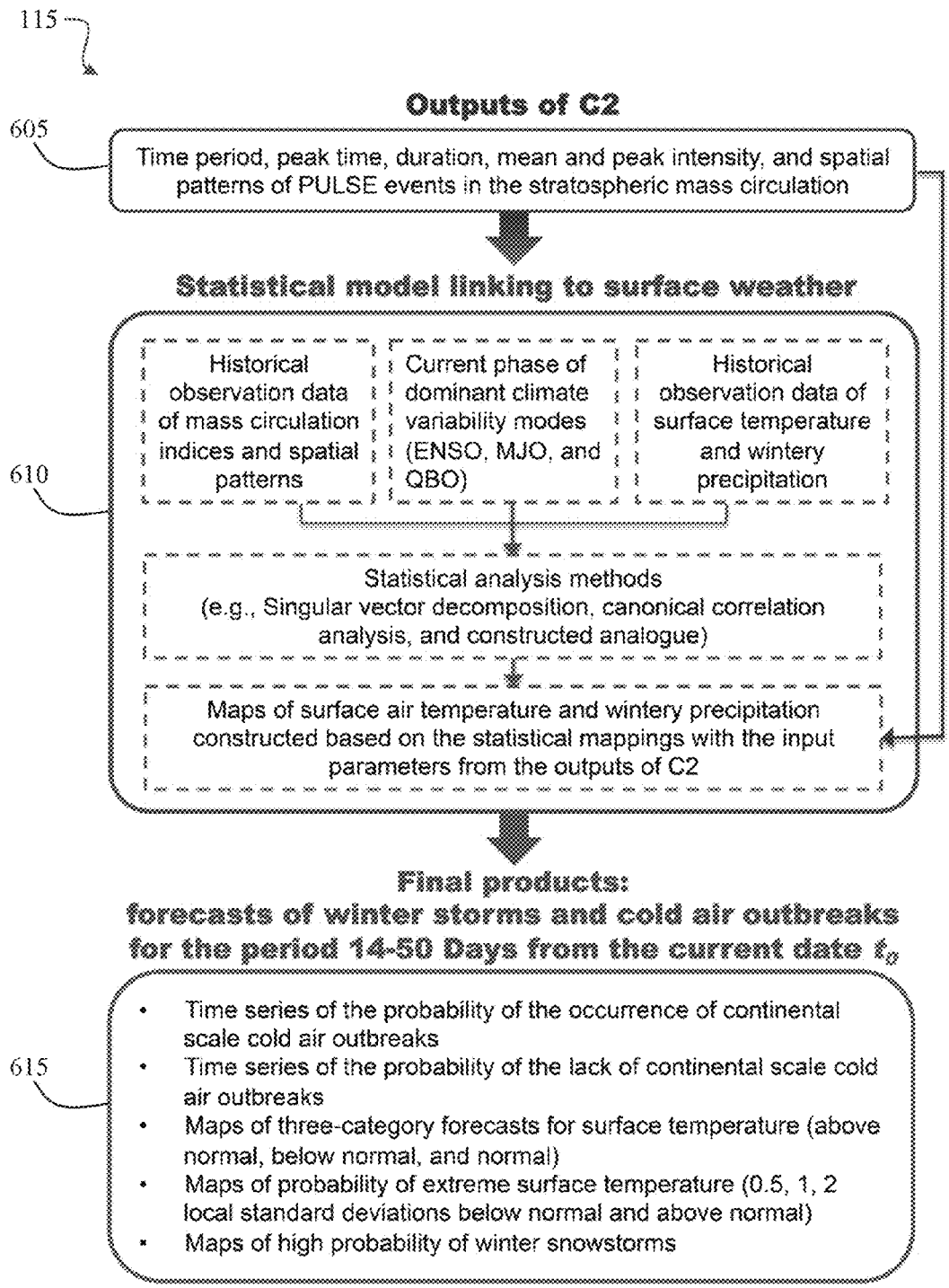
FIG. 4 is a schematic diagram illustrating the flow chart for key elements of the third core component of the hybrid model, in accordance with an embodiment of the present invention.

As illustrated in FIG. 4, the third core component 115 is built on the statistical models that link the stratospheric mass circulation indices and spatial patterns to the high probability of occurrence of winter snowstorms and CAOs of different severity and different spatial locations. In operational forecasts, the input parameters of the statistical models are the spatio-temporal information of the PULSEs, which are identified in the second core component 110. The end outputs of the third core component 115 deliver a set of final products of the hybrid model to the users of sub-seasonal forecasts of winter storms and CAOs on a weekly basis. The final products will be delivered in the form of time series and temporally evolving maps at lead times of from day 14 to day 50. Examples of the final products include: (1) time series of the probability of occurrence of continental scale CAOs, (2) time series of the probability of the lack of continental scale CAOs, (3) maps of three-category forecasts for surface temperature (above normal, below normal, and normal), (4) maps of probability of extreme surface temperature (0.5, 1, 2 local standard deviations below normal and above normal), (5) maps of surface air temperature and (6) maps of high probability of winter snowstorms.

Because the temporal lead information for sub-seasonal forecasts of snowstorms and CAOs in the hybrid model comes from operational models' forecasts, it is necessary to consider the following two requirements in selecting the key circulation indices for forecasting the snowstorms and CAOs. The first requirement is that they are predictable by operational models with a useful skill at a lead time longer than 2 weeks, and the second requirement is that they are associated with dynamical processes that are physically responsible for individual CAOs. The second requirement allows for a built-in causal relation in the statistical diagnostic component that links individual CAOs to circulation indices. Unlike monthly or seasonal mean temperature anomalies, the day-to-day variability of temperature anomalies is driven mainly by weather systems (i.e., troughs/cyclones and ridges/anticyclones), therefore, such circulation indices need to be indicative of the dynamic processes that cause the development of weather systems.

The details presented below indicate that indices that measure the intensity of the stratospheric mass circulation and its spatial patterns would meet both the first requirement and the second requirement outlined above. First, they can be predicted by operational models with a useful skill at lead times beyond two weeks (up to 50 days). The association of the meridional mass circulation with baroclinic waves depends on the amplitude of waves, their westward tilting structure, and their spatial scales, but not necessarily on the exact locations of their troughs and ridges. Therefore, an operational forecast model would still have skillful forecasts for the intensity of the meridional mass circulation as long as it can capture the amplitude and their spatial structure even though it cannot accurately predict the locations of troughs and ridges of these waves, which is supported by previous works. Second, atmospheric mass circulation in the extratropics is driven by the development of westward tilted baroclinic waves and the baroclinic waves are responsible for synoptic-scale weather systems. Therefore, these mass circulation indices do provide physical causal relationship that links CAOs and their spatial patterns to atmospheric circulations. Another advantage of using indices that measure the intensity of the stratospheric mass circulation is that they can be independently and explicitly calculated from the instantaneous total flow without the need for decomposition into time mean and transient flows nor for the separation into zonal mean and wave flows. Therefore, one can calculate mass circulation indices directly from the output fields of operational models once they are generated without waiting for forecast outputs at other lead times (or initial conditions) for averaging, which is essential for issuing forecasts in real time.

Figure 2:
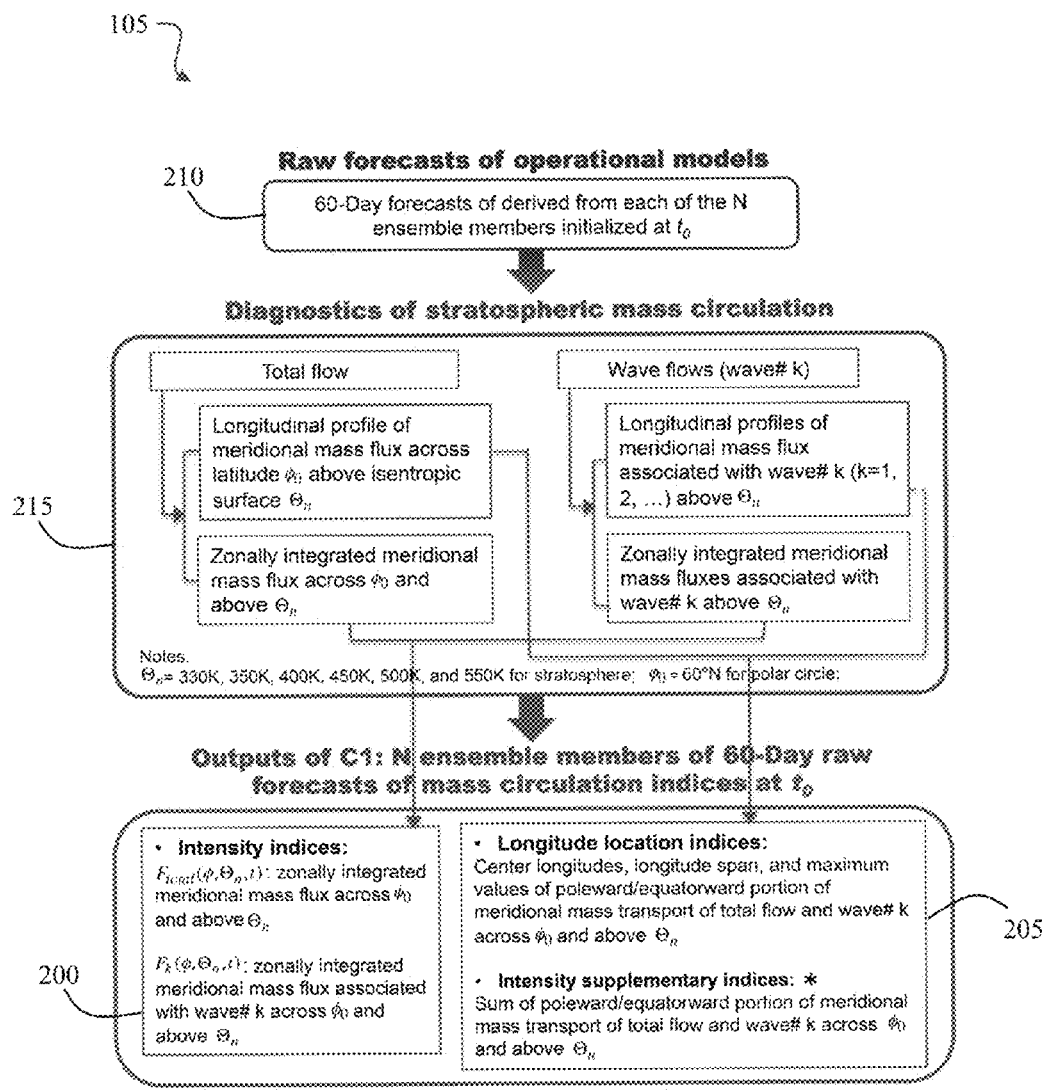
FIG. 2 is a schematic diagram illustrating the flow chart for key elements of the first core component of the hybrid model for sub-seasonal forecasts of winter storms and CAOs, in accordance with an embodiment of the present invention.

As shown in FIG. 2, the operation of the first core component 105 begins by receiving the raw forecasts from the operational models 210. Next, diagnostics of the stratospheric mass circulation are performed 215 to generate N ensemble members of 60-day raw forecasts of mass circulation indices 200, 205 at time $t_0$. As such, the indices 200, 205 that describe the state of the stratospheric mass circulation in the extratropics, including its spatial pattern and intensity, and temporal evolution are the key sub-components of the first core component 105, as shown in FIG. 2. These indices 200, 205 can be constructed by the following procedures:

In a first step 210, the air temperature and wind fields derived from model forecasts (or observations) are interpolated onto 200 equally spaced sigma ($\sigma$) levels from 1 to 0.

A next step involves performing diagnostics of stratospheric mass circulation 215, wherein a Fourier transfer is performed to decompose the total meridional wind field $v(\lambda,\phi,\sigma,t)$, at each latitude $\phi$, sigma level $\sigma$, time t, into wave components along longitude $\lambda$, namely:

$$v(\lambda, \phi, \sigma, t) = \sum_k v_k(\lambda, \phi, \sigma, t), \qquad (1)$$

where the subscript k denotes the zonal wave number (k=0, 1, 2, 3, ...). It is noted that $v_0$ represents zonal mean meridional wind and therefore it does not vary with longitude. Because the flow in the extratropics is nearly in geostrophic balance, is follows that $v_0(\phi,\sigma,t) \approx 0$ in a given extratropical latitude.

The air mass, $m_\sigma$, between two adjacent sigma surfaces per unit area is:

$$m_\sigma = \frac{\Delta \sigma}{g} P_s,$$

where $P_s$ is the surface pressure in units of Pascal, g is the constant of gravity and $\Delta\sigma=1/200$.

It can then be derived that the zonally integrated meridional mass flux above a specific isentropic surface $\Theta_n$ associated with wave number k (k=0, 1, 2, ...) at latitude $\phi$ on day t as:

$$F_k(\lambda, \phi, \Theta_n, t) = \qquad (2)$$
$$\int_0^{2\pi} \int_0^1 [m_\sigma(\lambda, \phi, \sigma, t) \cdot v_k(\lambda, \phi, \sigma, t)] \cdot H(\theta(\lambda, \phi, \sigma, t) - \Theta_n)$$
$$d\sigma \, d(R_E \cos\phi\lambda)$$

where $\theta(\lambda,\phi,\sigma,t)$ is potential temperature field and H(x) is the Heaviside function, such that H(x)=1 for x>0 and otherwise H(x)=0.

The total zonal integrated meridional mass flux above the isentropic surface $\Theta_n$ across latitude $\phi$ on day t can then be calculated as:

$$F_{total}(\phi, \Theta_n, t) = \sum_k F_k(\phi, \Theta_n, t), \qquad (3)$$

Next, longitude location indices 205 and intensity indices 200 of poleward and equatorward mass transport associated with each k (k=0, 1, 2, ...) are constructed from the following meridional mass flux fields above the isentropic surface $\Theta_n$ across latitude $\phi$ and at longitude $\lambda$ on day t:

$$f_k(\lambda, \phi, \Theta_n, t) = \int_0^1 [m_\sigma(\lambda, \phi, \sigma, t) \cdot v_k(\lambda, \phi, \sigma, t)] \cdot H(\theta(\lambda, \phi, \sigma, t) - \Theta_n) d\sigma, \quad (4)$$

The poleward mass transport is represented by positive values of $f_k$, while the equatorward mass transport is represented by negative values of $f_k$. For wave number k, there are k troughs/ridges, thus k longitudes of maximum polewar/equatorward mass fluxes, wherein these longitudes are denoted as $\lambda_i$, (i=1, 2, ... k). The center longitudes of poleward and equatorward mass transport associated with each k can be easily identified from the local positive maximum values and local negative maximum values of $f_k$, respectively, denoted as:

$$\{\lambda_{i,k}^{poleward}(\phi,\Theta_n,t), i=1,2,\ldots,k\} \text{ and } \{\lambda_{i,k}^{equatorward}(\phi,\Theta_n,t) i=1,2,\ldots,k\}.$$

Also, the values of poleward and equatorward mass transport associated with each k at these locations can be defined as, namely, $\{f_k(\lambda_{i,k}^{poleward},\phi,\Theta_n,t), i=1, 2, \ldots, k\}$ and $\{f_k(\lambda_{i,k}^{equatorward},\phi,\Theta_n,t), i=1, 2, \ldots, k\}$. Note that because mass fields varies greatly along longitude due to the zonal variations of temperature, these longitude locations do not follow exact wave number k patterns and their values at these longitudes are not constant.

The zonal integral of $\{f_k(\lambda_{i,k}^{poleward},\phi,\Theta_n,t), i=1, 2, \ldots, k\}$ and $\{f_k(\lambda_{i,k}^{equatorward},\phi,\Theta_n,t), i=1, 2, \ldots, k\}$ measures the meridional mass exchange across latitude $\phi$ due to wave number k, denoted as $F_k^{poleward}(\phi,\Theta_n,t)$ and $F_k^{equatorward}(\phi,\Theta_n,t)$, respectively. The total meridional mass exchange can be obtained by $$F_{total}^{poleward}(\phi, \Theta_n, t) = \sum_k F_k^{poleware}(\phi, \Theta_n, t) \quad (5)$$

$$F_{total}^{equatorward}(\phi, \Theta_n, t) = \sum_k F_k^{equatorward}(\phi, \Theta_n, t)$$

$F_{total}^{poleward}(\phi,\Theta_n,t)$ and $F_{total}^{equatorward}(\phi,\Theta_n,t)$ tend to vary highly in phase with almost identical amplitude, thus $F_{total}^{poleward}(\Theta_n,t)$ can merely be used to do forecasts. These location and supplementary intensity indices collectively describe the horizontal structure of stratospheric mass circulation. The information contained in these indices includes the longitude spans where warm air gets into the polar stratosphere and cold air out of the polar stratosphere, as well as their intensity.

For the stratospheric mass circulation into the polar region, $\phi=60°$ N is used and $\Theta_n=330K, 350K, 400K, 450K, 500K,$ and 550K in equations (2)-(5). Currently, wave number 1 and wave number 2 components of each variable are being considered, namely k=1 and k=2. The magnitude of these meridional mass flux indices is determined collectively by both amplitude and the westward vertical tilting structure of baroclinic waves. The longitudes of maximum poleward/equatorward mass transport in the stratosphere across the polar circle ($\lambda_k^{poleward}$ and $\lambda_k^{equatorward}$) allow for the inference of the temporal and spatial evolutions of the stratospheric mass circulations at a lead time of 0-50 days from forecasts of operational models.

Figure 5:
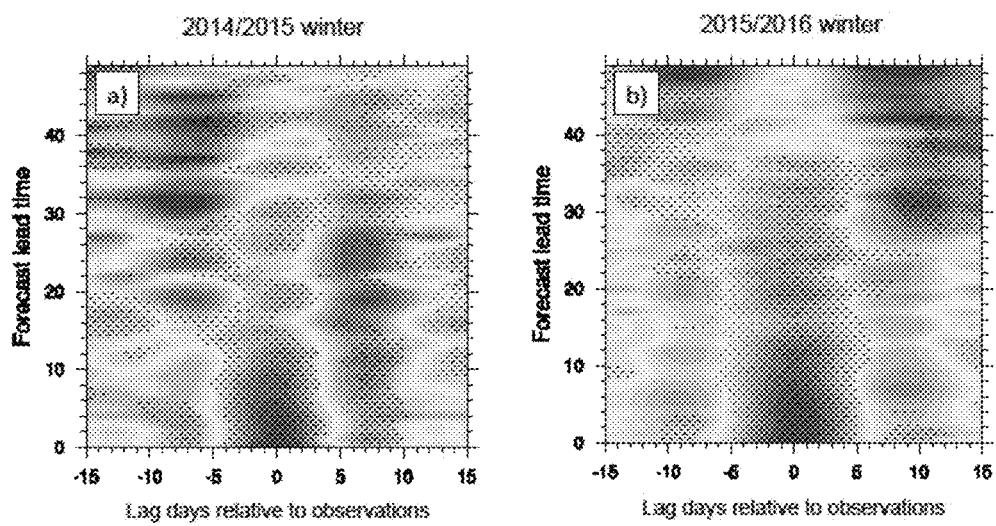
FIG. 5 illustrates correlation scores of the index $F_{total}$(60° N, 400K, t) derived from 4 ensemble members of forecasts of forecasted by the operational model CFSv2 in the (a) winter 2014-15 and (b) winter 2015-16 as a function of forecast lead time (ordinate, days) and lagged verification time (abscissa, days). The dotted area indicates statistical significance at the 5% level.

The correlation skill of the index $F_{total}(60°$ N, 400K, t) given in (3) forecasted by the operational model CFSv2 in the winter 2013-14 as a function of forecast lead time and lagged verification time has been previously considered. In the present invention, the correlation of 0.3 as the cut-off for "marginally useful" skill in the sub-seasonal range, a term that is borrowed from the experience in predictions of upper level (i.e., 500 hPa height) charts in the 6-10 day range is considered. It is demonstrated that the CFSv2 does possess useful skill (above 0.4) in predicting the index $F_{total}(60°$ N, 400K, t) even when the lead time is longer than 2 weeks, particularly at the range between 35 and 45 days. Moreover, the correlation skill at the range between 15 and 35 days is substantially improved when the forecasts are verified at an earlier time (positive lag, which attempts to account for the systematic delay errors of the CFSv2 forecasts). This confirms that the overall correlation skill of the operational CFSv2 forecasts for the in the 2013-14 winter season remained above the 0.5 level throughout the 45 days of lead time, after the timing error, which is within the range of 1-10 days, has been taken into consideration. The correlation skill is expected to be better when using ensemble forecasts. Recently, with available sub-seasonal forecasts by CFSv2 with 4 ensemble members in 2014-15 and 2015-16 winters, this conjecture has been confirmed, as shown in FIG. 5. Therefore, the operational CFSv2 forecasts indeed possess useful prediction skill for the stratospheric mass circulation, namely the isentropic meridional mass circulation above 400 K, at a lead time of 30 days and longer.

However, the skill of raw forecasts directly derived from outputs of the operational models is not sufficiently high (i.e., the correlation score is 0.5 at most, far below the perfect correlation skill of 1.0) to be able to forecast surface weather accurately at the sub-seasonal range. The relatively poor skill, although useful, is due to the uncertainties in the timings and amplitude of the peaks and valleys of these stratospheric mass circulation indices in operational model forecasts. In operational centers, the common practice to reduce the uncertainties of forecasts is to apply some kind of temporal average or ensemble average to forecasts products. Such noise-filtering techniques may be suitable for sub-seasonal forecasts of monthly or seasonal means of climate anomalies, but at the expense of substantially diluting the individual signal. In other words, the day-to-day temporal information is removed in the averaging process and yet the information about the timing is one of the most essential elements for weather forecasts. For this reason, such averaging techniques would not work for sub-seasonal forecasts of weather events, such as winter snowstorms and CAOs.

The success of the forecasts of the timing of weather events at the sub-seasonal range provided by the hybrid model of the present invention relies more on the ability to detect the time period that has a high probability of the occurrence of PULSE events described by these indices defined in (2) and (3).

Figure 3:
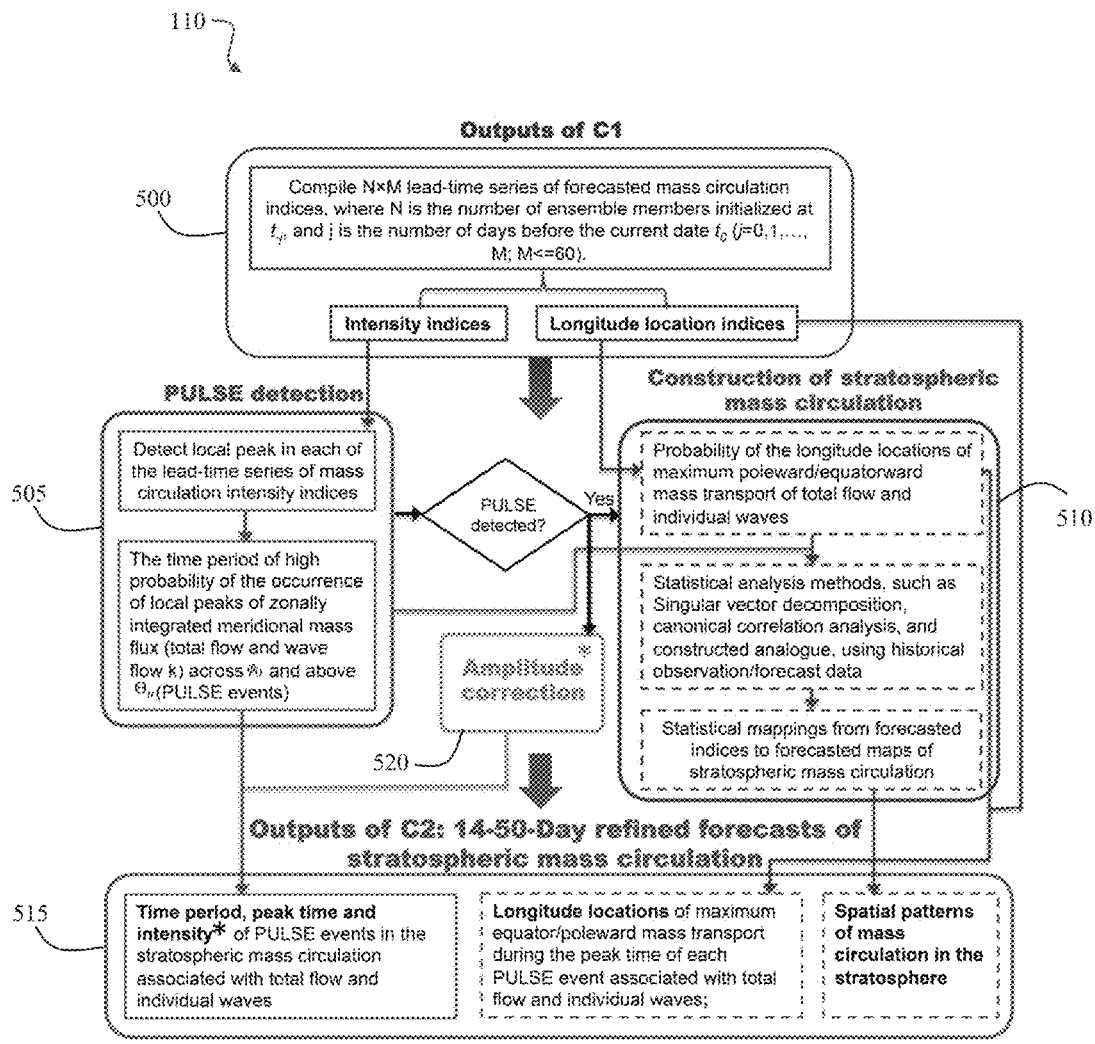
FIG. 3 is a schematic diagram illustrating the flow chart for key elements of the second core component of the hybrid model, in accordance with an embodiment of the present invention.

With reference to FIG. 3, in various embodiments, the present invention provides a peak detection algorithm that enables for the detection of the time period of a relatively high probability of the occurrence of PULSE events from the stratospheric mass circulation intensity indices that are derived directly from the raw forecast outputs of operational models, as provided by the second core component 110. The probability is determined from individual ensemble members (N) issued at the same time and individual forecasts issued at different times (M, M<=60) 500. In operation, the outputs of the first core component 105 are provided to the second core component 110 to generate the lead-time series comprising the intensity indices and the longitude location indices 500. PULSE detection is initiated 505 and construction of stratospheric mass circulation is performed 510 to generate the 14-50 day refined forecasts of stratospheric mass circulation 515, thereby providing a novel way to utilize the large members of ensemble forecasts without taking temporal average or ensemble average. As a result, the temporal information for the occurrence of PULSEs events predicted by operational models at the sub-seasonal range, which already has useful skill, remains more or less undiluted. This is the key procedure that allows the present invention to elevate the useful information of the raw forecasts to a level of nearly perfect, as far as the timings of occurrence of PULSEs are concerned.

The amplitude of the stratospheric mass circulation indices, however, tends to decrease at longer forecast lead times, though such deterioration of amplitude forecasts is not as severe as surface and tropospheric variables. In the present invention, an amplitude correction scheme 520 has been developed to correct the systematic error in predicting the amplitude of stratospheric mass circulation indices. A given index x at time t derived from numerical model forecasts is denoted as $x(t, \tau)$, $\tau=1, \ldots 60$, and its counterpart from observations as $x(t, 0)$. From the available historical sub-seasonal forecast data, model's daily annual cycles of x are obtained for each calendar day for each lead time $\tau$, denoted as $\bar{x}(day\_of\_year, \tau)$. Then anomaly fields ($x'(t, \tau)$) can be obtained by subtracting $\bar{x}(day\_of\_year, \tau)$ at the corresponding calendar day from the total fields. The amplitude correction coefficient for x as a function of forecast lead time $z$ can be derived as:

$$c_x(\tau) = \frac{\sum_{i=1}^{N^+(0)}\sum_{j=1}^{N^+(\tau)} \frac{x'(T^+(i,0),0)}{x'(T^+(j,\tau),\tau)} \cdot H(\Delta T, |T^+(i,0) - T^+(j,\tau)|) + \sum_{i=1}^{N^-(0)}\sum_{j=1}^{N^-(\tau)} \frac{x'(T^-(i,0),0)}{x'(T^-(j,\tau),\tau)} \cdot H(\Delta T, |T^-(i,0) - T^-(j,\tau)|)}{\sum_{i=1}^{N^+(0)}\sum_{j=1}^{N^+(\tau)} H(\Delta T, |T^+(i,0) - T^+(j,\tau)|) + \sum_{i=1}^{N^-(0)}\sum_{j=1}^{N^-(\tau)} H(\Delta T, |T^-(i,0) - T^-(j,\tau)|)}, \quad (5)$$

where $N^+(\tau)$ is the total number of local peaks in the time series of $x'(t, \tau)$ during the 5 winters, and $T^+(k, \tau)$ ($k=N^+(\tau)$) is the corresponding peak date; Similarly, $N^-(\tau)$ is the total number of local valleys in the time series of $x'(t, \tau)$, and $T^-(k, \tau)$ ($k=1, N^-(\tau)$) is the corresponding date of the valley; note that $T=0$ is for observation and otherwise forecasts. Defining $\Delta T=3$, allows the peak/valley of forecasted $x'(t, \tau)$ to have a time lead/lag of less than 3 days relative to the that of observed $x'(t, \tau=0)$. By definition, $c_x(\tau)$ measures the average ratio of the amplitude of observation to that of forecasts at lead time of $\tau$ days. Evidently, $c_x(\tau=0)=1$.

Figure 6:
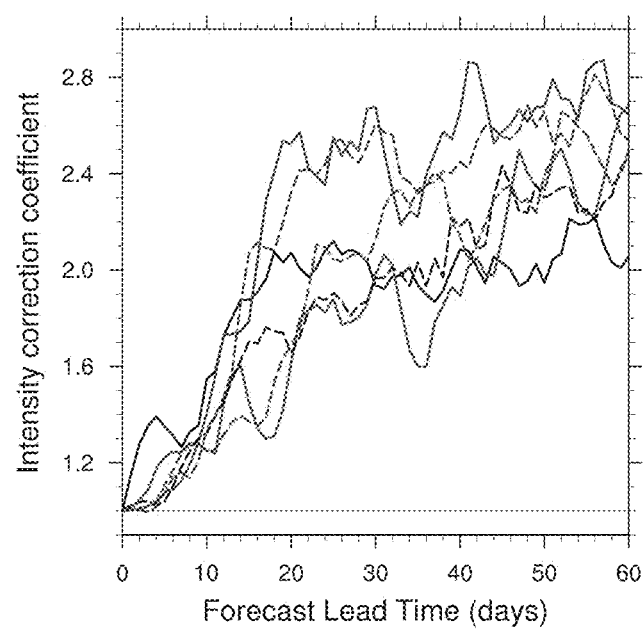
FIG. 6 illustrates amplitude correction coefficients as a function of forecast lead time (abscissa, days) for $F_{total}$ (60° N, 400K, t), $F_1$ (60° N, 400K, t), and $F_2$ (60° N, 400K, t), respectively indicated by black, red and blue solid curves, and $F^{poleward}$ (60° N, 400K, t), $F_1^{poleward}$ (60° N, 400K, t), and $F_2^{poleward}$ (60° N, 400K, t) indicated by black, red and blue dashed curves. These coefficients were derived from CFSv2 sub-seasonal forecasts and CFSR reanalysis data during 5 winters (November-March) in period 2011-2016.
Figure 7A:
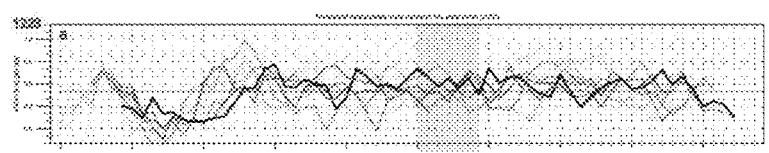
FIG. 7A is a graphical illustration of an unfiltered lead-time series of four-ensemble mean intensity indices of stratospheric mass circulation of total flow at 60° N and above the isentropic level 400 K, derived from the raw forecasts made by the operational model CFSv2 at the latest 6 days before December 23, namely December 17-December 23 (color curves), and that on December 23 (black curve), in accordance with an embodiment of the present invention.
Figure 7B:
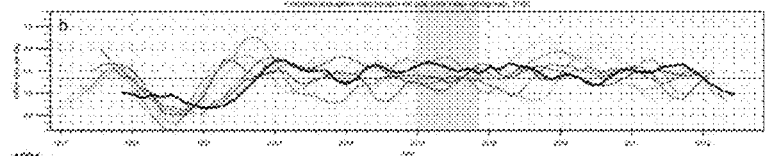
FIG. 7B is a graphical illustration of the 3-day running mean data shown in FIG. 7A, in accordance with an embodiment of the present invention.
Figure 7C:
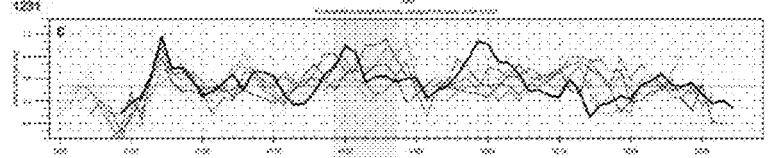
FIG. 7C is a graphical illustration of an unfiltered lead-time series of four-ensemble mean intensity indices of stratospheric mass circulation of total flow at 60° N and above the isentropic level 400 K, derived from the raw forecasts made by the operational model CFSv2 at the latest 6 days before December 31, in accordance with an embodiment of the present invention.
Figure 7D:
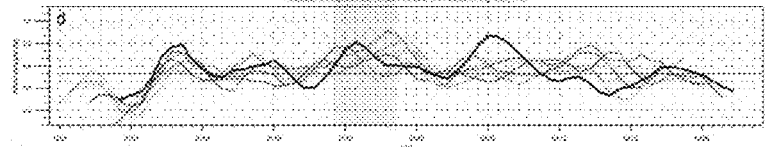
FIG. 7D is a graphical illustration of the 3-day running mean data shown in FIG. 7C, in accordance with an embodiment of the present invention.
Figure 7E:
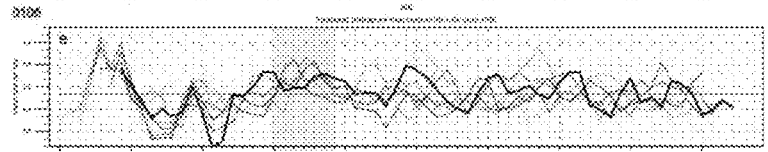
FIG. 7E is a graphical illustration of an unfiltered lead-time series of four-ensemble mean intensity indices of stratospheric mass circulation of total flow at 60° N and above the isentropic level 400 K, derived from the raw forecasts made by the operational model CFSv2 at the latest 6 days before January 6, in accordance with an embodiment of the present invention.
Figure 7F:
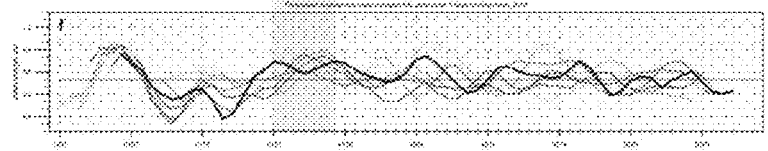
FIG. 7F is a graphical illustration of the 3-day running mean data shown in FIG. 7E, in accordance with an embodiment of the present invention.
Figure 7G:
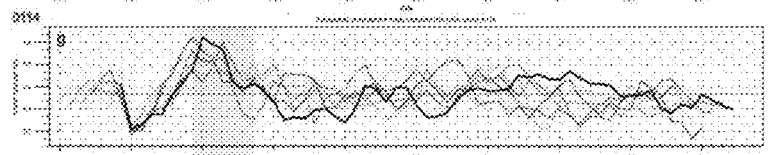
FIG. 7G is a graphical illustration of an unfiltered lead-time series of four-ensemble mean intensity indices of stratospheric mass circulation of total flow at 60° N and above the isentropic level 400 K, derived from the raw forecasts made by the operational model CFSv2 at the latest 6 days before January 14, in accordance with an embodiment of the present invention.
Figure 7H:
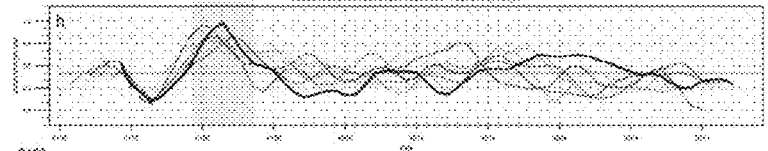
FIG. 7H is a graphical illustration of the 3-day running mean data shown in FIG. 7G, in accordance with an embodiment of the present invention.
Figure 7I:
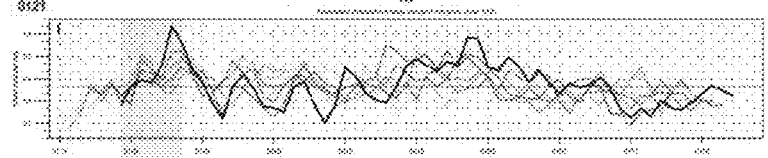
FIG. 7I is a graphical illustration of an unfiltered lead-time series of four-ensemble mean intensity indices of stratospheric mass circulation of total flow at 60° N and above the isentropic level 400 K, derived from the raw forecasts made by the operational model CFSv2 at the latest 6 days before January 21, in accordance with an embodiment of the present invention.
Figure 7J:
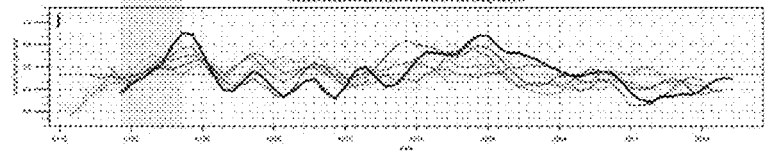
FIG. 7J is a graphical illustration of the 3-day running mean data shown in FIG. 7I, in accordance with an embodiment of the present invention.
Figures 8A, 8B, 8C, 8D, 8E, 8F, 8G, 8H, 8I, 8J:
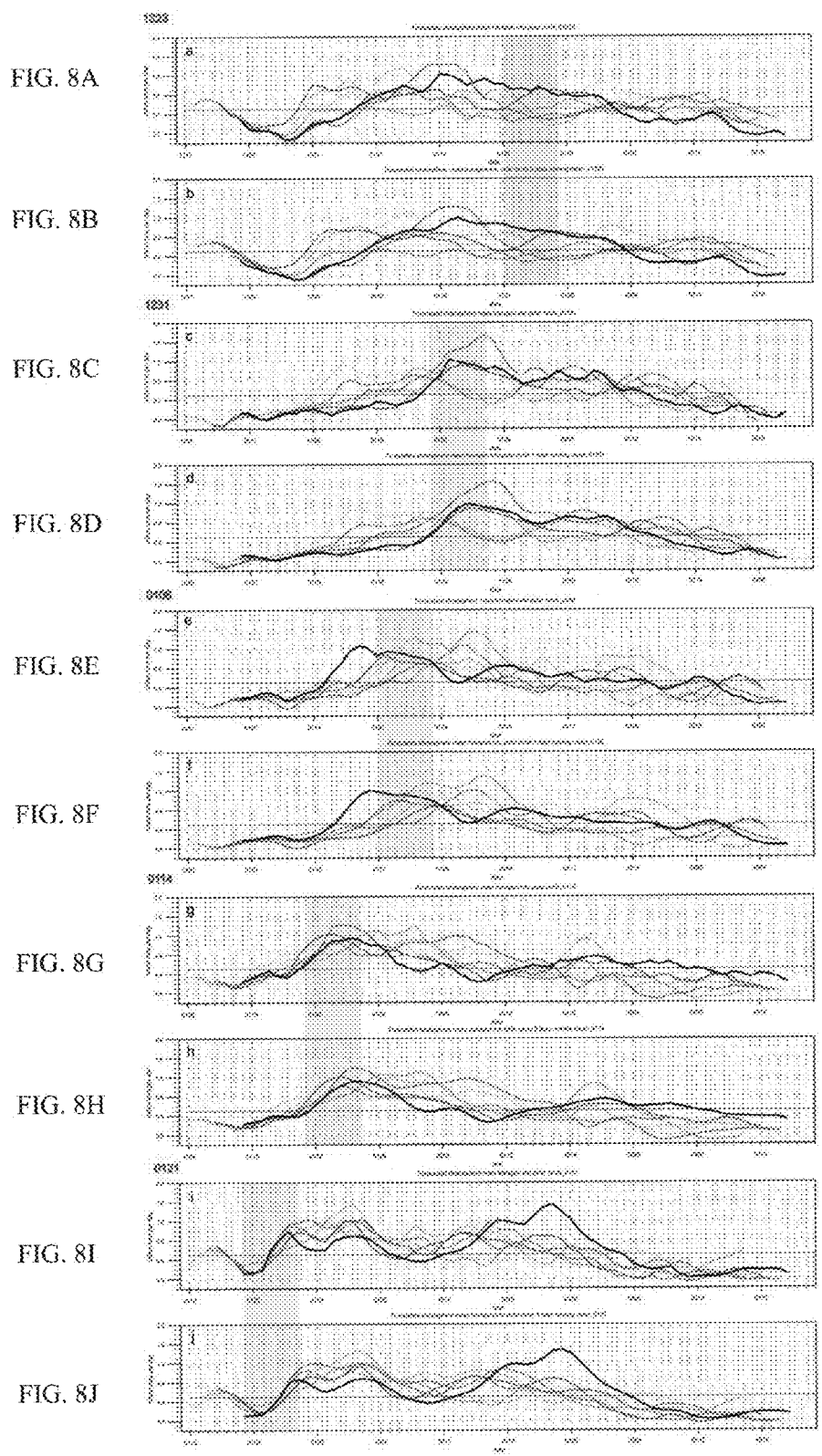
FIG. 8A is a graphical illustration of an unfiltered lead-time series of four-ensemble mean intensity indices of stratospheric mass circulation of wave number 1 at 60° N and above the isentropic level 400 K, derived from the raw forecasts made by the operational model CFSv2 at the latest 6 days before December 23, namely December 17-December 23 (color curves), and that on December 23 (black curve), in accordance with an embodiment of the present invention.
FIG. 8B is a graphical illustration of the 3-day running mean data shown in FIG. 8A, in accordance with an embodiment of the present invention.
FIG. 8C is a graphical illustration of an unfiltered lead-time series of four-ensemble mean intensity indices of stratospheric mass circulation of wave number 1 at 60° N and above the isentropic level 400 K, derived from the raw forecasts made by the operational model CFSv2 at the latest 6 days before December 31, in accordance with an embodiment of the present invention.
FIG. 8D is a graphical illustration of the 3-day running mean data shown in FIG. 8C, in accordance with an embodiment of the present invention.
FIG. 8E is a graphical illustration of an unfiltered lead-time series of four-ensemble mean intensity indices of stratospheric mass circulation of wave number 1 at 60° N and above the isentropic level 400 K, derived from the raw forecasts made by the operational model CFSv2 at the latest 6 days before January 6, in accordance with an embodiment of the present invention.
FIG. 8F is a graphical illustration of the 3-day running mean data shown in FIG. 8E, in accordance with an embodiment of the present invention.
FIG. 8G is a graphical illustration of an unfiltered lead-time series of four-ensemble mean intensity indices of stratospheric mass circulation of wave number 1 at 60° N and above the isentropic level 400 K, derived from the raw forecasts made by the operational model CFSv2 at the latest 6 days before January 14, in accordance with an embodiment of the present invention.
FIG. 8H is a graphical illustration of the 3-day running mean data shown in FIG. 8G, in accordance with an embodiment of the present invention.
FIG. 8I is a graphical illustration of an unfiltered lead-time series of four-ensemble mean intensity indices of stratospheric mass circulation of wave number 1 at 60° N and above the isentropic level 400 K, derived from the raw forecasts made by the operational model CFSv2 at the latest 6 days before January 21, in accordance with an embodiment of the present invention.
FIG. 8J is a graphical illustration of the 3-day running mean data shown in FIG. 8I, in accordance with an embodiment of the present invention.
Figure 9A:
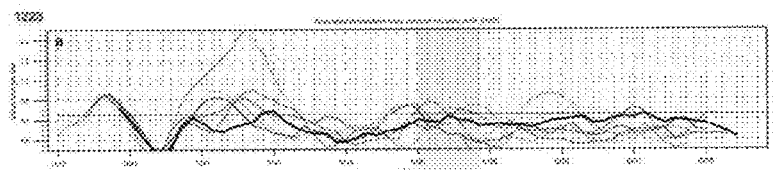
FIG. 9A is a graphical illustration of an unfiltered lead-time series of four-ensemble mean intensity indices of stratospheric mass circulation of wave number 2 at 60° N and above the isentropic level 400 K, derived from the raw forecasts made by the operational model CFSv2 at the latest 6 days before December 23, namely December 17-December 23 (color curves), and that on December 23 (black curve), in accordance with an embodiment of the present invention.
Figure 9B:
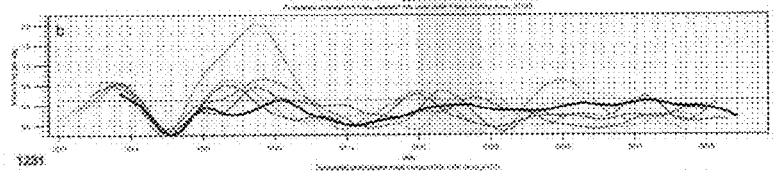
FIG. 9B is a graphical illustration of the 3-day running mean data shown in FIG. 9A, in accordance with an embodiment of the present invention.
Figure 9C:
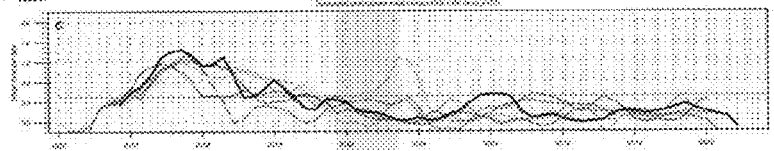
FIG. 9C is a graphical illustration of an unfiltered lead-time series of four-ensemble mean intensity indices of stratospheric mass circulation of wave number 2 at 60° N and above the isentropic level 400 K, derived from the raw forecasts made by the operational model CFSv2 at the latest 6 days before December 31, in accordance with an embodiment of the present invention.
Figure 9D:
FIG. 9D is a graphical illustration of the 3-day running mean data shown in FIG. 9C, in accordance with an embodiment of the present invention.
Figure 9E:
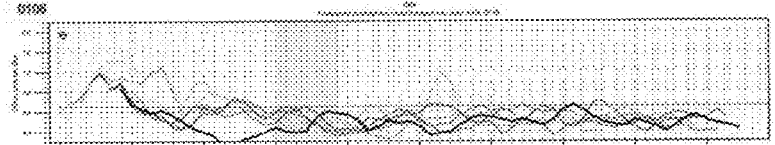
FIG. 9E is a graphical illustration of an unfiltered lead-time series of four-ensemble mean intensity indices of stratospheric mass circulation of wave number 2 at 60° N and above the isentropic level 400 K, derived from the raw forecasts made by the operational model CFSv2 at the latest 6 days before January 6, in accordance with an embodiment of the present invention.
Figure 9F:
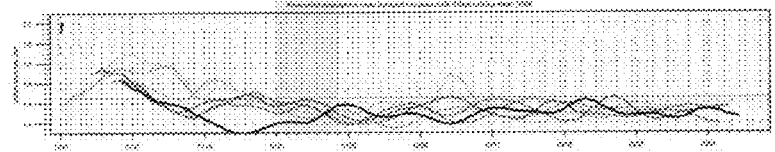
FIG. 9F is a graphical illustration of the 3-day running mean data shown in FIG. 9E, in accordance with an embodiment of the present invention.
Figure 9G:
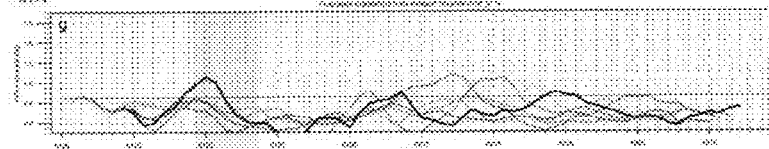
FIG. 9G is a graphical illustration of an unfiltered lead-time series of four-ensemble mean intensity indices of stratospheric mass circulation of wave number 2 at 60° N and above the isentropic level 400 K, derived from the raw forecasts made by the operational model CFSv2 at the latest 6 days before January 14, in accordance with an embodiment of the present invention.
Figure 9H:
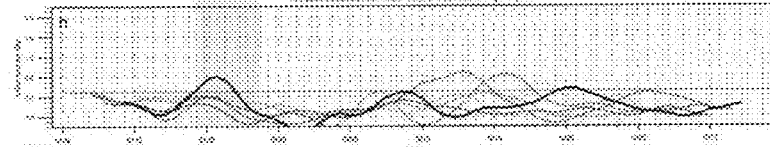
FIG. 9H is a graphical illustration of the 3-day running mean data shown in FIG. 9G, in accordance with an embodiment of the present invention.
Figure 9I:
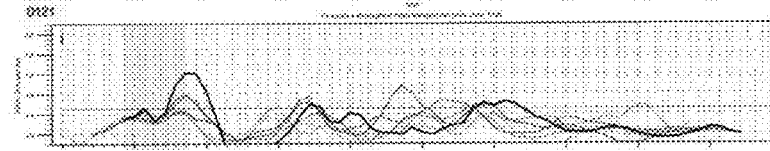
FIG. 9I is a graphical illustration of an unfiltered lead-time series of four-ensemble mean intensity indices of stratospheric mass circulation of wave number 2 at 60° N and above the isentropic level 400 K, derived from the raw forecasts made by the operational model CFSv2 at the latest 6 days before January 21, in accordance with an embodiment of the present invention.
Figure 9J:
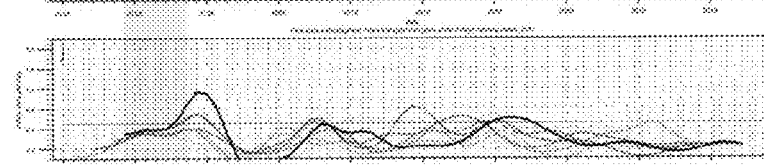
FIG. 9J is a graphical illustration of the 3-day running mean data shown in FIG. 9I, in accordance with an embodiment of the present invention.

Displayed in FIG. 6 are the amplitude correction coefficients for 6 key indices, namely $F_{total}(\phi,\Theta_n,t)$, $F_k(\phi,\Theta_n,t)$, $F_{total}^{poleward}(\phi,\Theta_n,t)$, and $F_k^{poleward}(\phi,\Theta_n,t)$ where $\phi=60°$ N, $\Theta_n=400K$, and k=1 and k=2. In real forecasts, the anomaly of forecast time series (x') is obtained by removing the $\bar{x}(day\_of\_year, \tau)$. Then, the timing of local peak/valley of the forecast time series, e.g., $\tau_p$, is detected and the peak/valley amplitude is corrected by multiplying $X'(\tau_p)$ by $c_x(\tau_p)$. Adding back the observed climatological annual cycle, more reliable forecasts of the intensity of strong stratospheric mass circulation events (PULSEs) and weak events can be obtained. The amplitude correction results can be further refined when multi-model forecast data with longer time ranges are available.

The spatial patterns of the stratospheric circulation can be described by the longitude location and amplitude indices, as previously discussed. However, the uncertainties in these indices are much larger than those in the indices measuring the stratospheric PULSEs. Again, the probability of these indices can be constructed from ensemble members. These longitude location and amplitude indices can be evaluated jointly instead of individually. In other words, these location and amplitude indices are treated as an array of parameters that describe the state of the stratospheric mass circulation. By doing so, the statistical relations can be built that are directly related to the location and amplitude indices derived from raw forecast outputs to maps of stratospheric mass circulation using existing statistical analysis methods, such as singular vector decomposition, canonical correlation analysis, and constructed analogue. This is another way to utilize a large member of ensemble forecasts without using temporal and ensemble averages. The statistical mappings from forecasted indices to maps of observed flow effectively are "bias corrections" that can capture not only the systematic errors (flow independent biases) which the conventional ensemble average technique attempts to achieve, but also flow dependent forecast errors. Therefore, the information of the forecasted temporal evolution of the spatial patterns of stratospheric mass circulation is retained.

Using historical observation data, it has been shown that the PULSE events of the stratospheric mass circulation have a dominant timescale of about 2 weeks and have close "simultaneous" statistical relationship with individual massive CAOs over the two major continents in the Northern Hemisphere. Specifically, CAOs over two major continents in the Northern Hemisphere tend to take place within a short time period from one week before, to 1-2 weeks after, peak dates of PULSEs. The stronger a PULSE event is, or the longer its duration is, the higher the probability of occurrence of continental-scale CAOs. Such relationships can be partially explained by the known global meridional mass circulation theory. Recent studies indicate that the timing, magnitude and pattern of the associated surface impact highly depend on the dominant scale of wave forcing for a PULSE event. Specifically, CAOs tend to occur over Eurasia one week before the peak date of a PULSE event driven by wave number 1 and over North America within the 1-2 weeks after the PULSE. For a PULSE event driven mainly by wave activities of wave number 2, however, CAOs tend to be over both continents at the same time period as the peak time of the PULSE event. Due to the existence of such a close relationship between the state of stratospheric mass circulation intensity and surface CAOs, maps can be obtained of the composite means of surface air temperature anomaly and maps of the probability of cold/warm surface temperature of different intensity from 1 week before to 1-2 weeks after the peak dates of PULSE events of total flow depending on wave activities of different wave numbers. The longitude locations of maximum poleward and equatorward portions and their longitudinal spans of stratospheric mass circulation are also considered in constructing these maps of surface temperature anomalies. Combination of maps of surface temperature anomalies derived from stratospheric mass circulation indices with these well-established canonical patterns of surface temperature anomalies associated with dominant climate variability modes such as ENSO, MJO, and QBO, and the climatological seasonal cycle of the surface temperature leads to maps of the total surface temperature field. Maps of other variables/parameters, such as tropospheric circulation patterns and precipitation/snowfall from stratospheric circulation patterns and maps of (total) surface temperature field can also be prepared.

In summary, the information of maps of surface temperature field, synoptic weather systems, and the associated rainfall/snowfall derived from the statistical model comes from three main sources. The first one is the information about the state of the stratospheric circulation derived from the output of the second core component (e.g., the overall intensity of stratospheric mass circulation and spatial patterns of stratospheric mass circulation). The second one is from amplitudes and phases of dominant climate variability modes. The third one is the climatological seasonal cycle. Note that the temporal lead information in the hybrid model for sub-seasonal forecasts of winter storms and CAOs comes from dynamics/physics based state-of-the-art operational models in predicting the state of the stratospheric mass circulation, and the statistical relationships are only applied as a diagnostic tool (rather than a prediction tool) for the hybrid forecasts. Therefore, the existence of precursor information in the statistical diagnostic component is not required. The lead information derived from dynamical models (i.e., first core component 105 and second core component 110) dictate the timing of CAOs and wintery storms in the sub-seasonal forecasts whereas the "simultaneous" statistical relationships of temporal and spatial evolutions of surface temperature and precipitation with the intensity/duration of stratospheric mass circulation (i.e., third core component 115) provide the location information of the forecasted CAOs and wintery storms.

A prototype of the third core component 115, shown in FIG. 4, is provided, which can yield products including maps of forecasts for surface air temperature (SAT) anomaly, maps of probability of three-category forecasts for SAT (above normal, below normal, and normal) within the 2 weeks centered at peak dates of PULSE events at lead times from 2 weeks to 6 weeks 615. The prototype utilizes a method called constructed analogue (CA), which has been used in a statistical model for global SST and U.S. soil moisture. The method is applied here to link stratospheric mass circulation indices derived from numerical model forecasts (predictors) 605 to the spatial pattern of SAT anomalies in the extratropics (predicted) 610.

The historical dataset of predictors is a set of d-day integrated (d=0, 1, . . . D) mass circulation index anomalies (climatological annual cycle removed) before and after the peak dates of all historical PULSE events found during 30 winters (December-February). This historical dataset can be derived from daily reanalysis data (e.g., ERA-Interim, CFSR). Denoting the total number of historical PULSE peak days as N, this historical dataset of predictor is denoted as $X(m, t\_peak\_n, d)$, where m is the index for one of the selected mass circulation indices (there are total M of them) and n=1 . . . N, d=0, 1, . . . D. The target dataset of predictors are the same number of M d-day integrated mass circulation indices before and after the peak day (denoted as $t_{target}$) of the PULSE that is forecasted by the numerical model at the lead time $\tau$, $X_{model}(m, t_{target}, d; \tau_0)$. All values in both historical and target datasets are normalized by the standard deviations derived from historical dataset at each calendar day in winter. The following matrix A is then inverted to obtain the weights, $\vec{\alpha}$ for the constructed analog of the numerical-model-forecasted PULSE event according to:

$$A\vec{\alpha} = \vec{b}, \qquad (6)$$

$$\text{where} \begin{cases} A_{i,j} = \sum_m \sum_d X(m, t\_peak\_i, \pm d) X(m, t\_peak\_j, \pm d) \\ b_i = \sum_m \sum_d X(m, t\_peak\_i, \pm d) X_{model}(m, t_{target}, \pm d; \tau) \end{cases}$$

Note that –d is used to denote the d-day integrated mass circulation indices prior to the peak day. The vector $\vec{\alpha}$ has a dimension of N. In order to keep the amplitude of predictand in check, small positive constants are added to the main diagonal of A (van den Dool, 1994) to guarantee the sum of $\vec{\alpha} \bullet \vec{\alpha}$ to be close but less than unity (stable solution). The constructed analogue of $X_{model}(m, t_{target}, \pm d; \tau)$ is given by $$X^{CA}(m, t_0, \pm d; \tau_0) = \sum_i \alpha_i X(m, t\_peak\_i, \pm d) \qquad (7)$$

It is noted that the states $X(k, t\_peak\_i, \pm d)$ are not orthogonal to one another. As a result, (6) is an approximate solution, which was first formulated in van den Dool (1994).

The same weights are used next to find corresponding maps of surface temperature anomalies in the extratropics (25-90° N) from $(t_{target}-D)$ days to $(t_{target}+D)$ days, namely $$SAT^{CA}(x, y, t_{target} \pm d; \tau) = \sum_i \alpha_i SAT(x, y, t\_peak\_i \pm d), \qquad (8)$$

The relationship in (8) can also be applied to other predictands (e.g., geopotential height at 1000 hPa, precipitation). A set of forecasted mass circulation indices at L different lead times can be used to obtain a set of $SAT^{CA}(x, y, t_{target} \pm d; \tau)$ as L members of ensemble forecasts of surface air temperature anomalies for each day from $(t_{target}-D)$ days to $(t_{target}+D)$ days after to is manually centered in the time series of $X_{model}(m, t_0 \pm d; \tau)$ to $t_{target}$, where $t_0$ is peak day of the forecasted PULSE event derived from the numerical model forecasts at different lead time, if $t_0$ is different from $t_{target}$. The lead time of our L-member ensemble forecasts corresponds to the longest $\tau$. Using the (2D+1)×L maps, we can construct maps of forecasts for mean surface air temperature anomalies and maps of probability of three-category forecasts for surface temperature anomalies (above normal, below normal, and normal) within a time period shorter than (2D+1) days centered at $t_{target}$ at a lead time $\tau$.

In a trial experiment, the following mass circulation indices are considered: $F_{total}(\phi, \Theta_n, t)$, $F_k(\phi, \Theta_n, t)$, $F_{total}^{poleward}(\phi, \Theta_n, t)$ and $F_k^{poleward}(\phi, \Theta_n, t)$ with $\phi=60°$ N, $\Theta_n=400K$, and k=1 and 2 (i.e. M=6). The d-day integrated mass circulation indices from 7 days before the peak day to 7 days after are considered. Thereby, the total number of predictors is 15×6. Considering a total 7 of different lead times, meaning that there are 7 members of ensemble forecasts of $SAT^{CA}(x, y, t_{target} \pm d; \tau)$ for each from $(t_{target}-7)$ days to $(t_{target}+7)$ or total of 15×7 maps of $SAT^{CA}(x, y, t_{target} \pm d; \tau)$ which allow for the construction of (i) maps of forecasts for mean surface air temperature anomalies and (ii) maps of probability of three-category forecasts for surface temperature anomalies in the week before, during, and after $t_{target}$.

Currently, neither operational centers nor private weather information providers routinely issue weather forecasts at the sub-seasonal range (i.e., 14-50 days in advance). Operational centers routinely (bi-weekly or monthly) issue forecasts for the monthly or seasonal mean climate anomalies 2-6 weeks from the forecast issuing date. The skill of such conventional sub-seasonal forecasts is very limited because numerical models no longer have useful skill at a lead time longer than 2 weeks. The useful skill of the conventional sub-seasonal forecasts exists mainly at the time with presence of large-amplitude of climate variability modes (such as ENSO, MJO, and AO). Due to the limited skill and lack of detailed temporal information, the conventional sub-seasonal forecasts only provide advisory information to stakeholders about monthly/seasonal average temperature and rainfall anomalies, without concerning the timing information of individual weather events.

The present invention is built on the 10 years of the inventors' research on the global meridional mass circulation and its application to sub-seasonal forecasts for CAOs. As previously described in detail, specifically, the invention is based on three theoretical and modeling advancements. The first is the modeling evidence indicating that the two-week predictability barrier is mainly due to models' errors in faithfully representing the coupling of dynamical and thermodynamic processes. The thermodynamic process in the stratosphere is mainly in the form of thermal radiative cooling which has a longer decaying time scale (20 days or longer). Therefore, numerical prediction models would have much smaller errors in capturing the temporal evolution of mass circulation in the stratosphere as the initial value problem. Building upon the modeling evidence, a set of newly developed indices describing the atmospheric mass circulation in the stratosphere have been and identified and it has been confirmed that they can be predicted by operational numerical models with useful skills at the sub-seasonal range indeed. The second advancement is the development of peak detection and amplitude correction algorithms that further elevate the useful skill in the raw forecasts by dynamical models to nearly perfect skill for predicting these indices 14-50 days in advance. The third advancement is that a set of built-in causal relation mappings that link extreme weather patterns, such as CAOs and wintery storms, to the stratospheric circulation indices have been discovered.

Currently, accurate forecasts of severe CAOs and wintery storms are available only up to two weeks in advance. The system and method of the present invention will allow predictors, for the first time, to provide reliable forecasts for these high impact weather events at the sub-seasonal range (14-50 days). The ability of forecasting high-impact extreme weather events at the sub-seasonal range allows predictors to meet great demand from a wide spectrum of stakeholders, ranging from decision makers at local, regional, and federal governments, transportation, e-commerce, energy providers, energy and commodity traders, insurance, and agriculture sectors.

In an exemplary embodiment of the present invention, STRAT_J, one of the super strong stratospheric PULSE events, was first forecasted on Dec. 23, 2015, occurred on Jan. 26, 2016, within the time window forecasted by the method of the present invention, which is between January 21 and Jan. 27, 2016. Associated with STRAT_J was the Winter Storm Jonas, which has been ranked as one of the biggest storms on record for many states along the Atlantic CAOst, topping the Blizzard of 1996 or the February 2003 President's Day II storm in some cases. Jonas also brought travel to a grinding halt with up to 11,000 flights in the U.S. canceled, closure of roads, bridges and tunnels. Moreover, wintery storms and CAOs associated with STRAT_J were also felt over other regions of the continents in northern hemisphere. A "super cold air outbreak" hit Eurasia around STRAT_J, causing freezing temperatures, strong wind and heavy wintery precipitation.

In this exemplary embodiment, the STRAT_J event is used as an example to illustrate how the sub-seasonal forecasts of CAOs beyond the 2-week limit of predictability are made using the hybrid model of the present invention.

In the implementation of the first core component 105, a program package was developed to automatically download the raw dataset of latest forecasts by CFSv2 at 00 z, and to calculate the key stratospheric mass circulation indices everyday as a function of forecast lead time. 00 z was chosen because there are four ensemble members of forecasts out to longer than 50 days, while forecasts initialized at 06 z, 12 z and 18 z has only one member of forecasts out to 50 days. Thus, in this case, the ensemble members issued at the same time (N) equals to 4. The outputs of the programs in the package are the lead-time series of forecasted stratospheric mass circulation indices from the current date to 50 days in the future. These are the outputs of the first core component 105. At the time when the forecasts for STRAT_J were first issued by the hybrid model, i.e., Dec. 23, 2015, there were at least 20 individual forecasts issued at different times for the mass circulation indices available for each of the dates from December 23 to January 22. As illustrated in FIG. 7A-FIG. 7J, it is seen that after the STRAT_I (January 13-January 19), most of the 7 forecasted time series tend to show local peaks around January 21-January 27. The peak intensity looked not strong, at most 0.8 trillion tons per day of mass transport into the polar stratosphere.

The main spatial scale of STRAT_J was further explored by examining the meridional mass transport due to different wave numbers. Since large-scale planetary waves (wave number 1 and 2) are the dominant waves in the stratosphere, we focus on these two wave flows. Based on the figures for the lead-time series of the forecasted stratospheric mass circulation intensity indices of wave number 1, as shown in FIG. 8A-FIG. 8J, and wave number 2, as shown in FIG. 9A-FIG. 9J, there were peaks in the lead-time series of forecasted intensity of stratospheric mass circulation of wave number 2 component during the period January 20-January 28. Within the time period, two time spans were detected most preferable for local peaks to occur. One is around January 20 and the other is around January 25. On the other hand, the forecasted stratospheric mass circulation intensity indices of wave number 1 had peaks around January 25, though not highly consistent nor with large amplitudes. Those outputs of the first core component 105 suggested the possibility of a stratospheric PULSE event to take place around the time interval from January 20 to January 28, attributed to stronger wave activities of both wave number 1 and wave number 2. However, the exact timing and number of peaks for the PULSE event cannot be objectively determined directly from the outputs of the first core component 105, because the timing of the local peaks in the lead-time series of forecasts with different initial condition shifted back and forth randomly, even though most of them were within the time window, as seen clearly from FIG. 7A-FIG. 7J, FIG. 8A-FIG. 8J and FIG. 9A-FIG. 9J.

Therefore, the raw forecasts directly derived from outputs of the operational models still have large uncertainties, as previously discussed.

Figure 10:
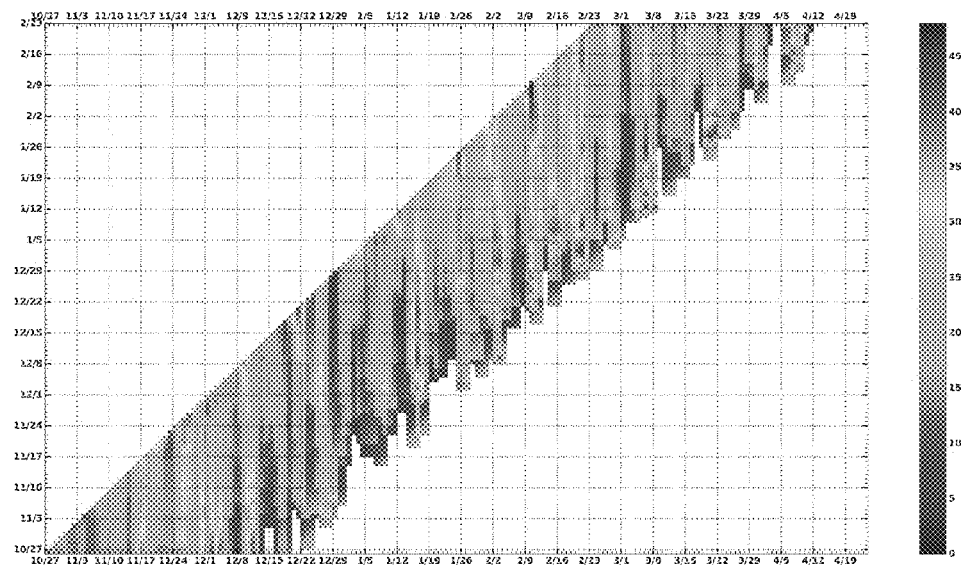
FIG. 10 is a graphical illustration of the probability of local peaks in the lead-time series of the forecasted intensity indices of total flow stratospheric mass circulation among available ensemble members at the date when forecasts were made (ordinate) for each verification date from Oct. 27, 2015 to April, 2016 (abscissa), in accordance with an embodiment of the present invention.

In this exemplary embodiment, the second core component 110 is then used to reduce the uncertainties in the raw forecast of stratospheric mass circulation intensity indices by operational models. Here, only part of the second core component is demonstrated, illustrating how the forecasts of the intensity indices of stratospheric mass circulation of total flow using the peak detection method were refined. Firstly, the local peaks in the lead-time series of the forecasted intensity indices for the total flow stratospheric mass circulation, initialized at the date from the current day to 50 days ago, 51 (M=51) forecast time series in total were detected. The individual curves shown in FIG. 7A-FIG. 7J and in FIG. 8A-FIG. 8J are examples of the 51 ensemble members initialized at different dates. Then, for each future dates within 50 days after the current date, ensemble members of forecasts for the same verification time from different initial dates and different forecast lead time were constructed. Take January 21 for example, when the forecasts were made on December 23, the oldest forecast member was made on December 3 (50 days prior to January 21), and the latest forecast member was made on December 23 (the current day). Therefore, there were 21 ensemble members of forecasts initialized at different dates for determining the possibility of local peaks to take place on January 21. Next, the probability of the occurrence of local peaks in the lead-time series of total flow of stratospheric mass circulation intensity index as a function of verification time (abscissa) and the dates when we made forecasts (ordinate) based on available forecasts were calculated, as shown in FIG. 10. It is seen that on December 23, a relatively high probability of occurrence was observed around January 26, which was as high as 25%. In addition, such a comparatively high probability can be traced back to the beginning of December with a relatively high probability of occurrence of peaks in the period of 1-2 days before and after two dates, namely January 19 and January 26. Based on that, it was forecasted that a new stratospheric PULSE event was expected to occur in the period January 21-January 27, and the event was alphabetically named as STRAT_J.

Once the forecasts of the indices measuring the state of the stratospheric mass circulation (i.e., the timing, dominant wave number, and intensity) by operational model CFSv2 have been obtained, they are put into the pre-constructed statistical model linking the stratospheric mass circulation to the surface weather, which is third core component 115 of the hybrid method of the present invention. Here, a simplified statistical model based on the relationship between the intensity index of total flow stratospheric mass circulation and the surface air temperature anomaly pattern is demonstrated. When associated with PULSEs dominated by stronger wave number 1, massive CAOs tend to occur over the entire mid-latitude regions of Eurasian continent about 1 week before the peak dates of PULSEs, and within the 1-2 weeks afterwards, most areas of North America tend to be occupied by below-normal temperatures, while for a PULSE event dominated by wave activities of wave number 2, CAOs tends to take place over both continents nearly at the same time with the peak dates of PULSEs. Since STRAT_J is forecasted to be associated with stronger wave activities of both wave number 1 and wave number 2 and the peak in the lead-time series of forecasted wave number 2 intensity looked more clear, in the exemplary embodiment, the forecasts of CAOs associated with STRAT_J (January 21-January 27) on December 23 may be issued as follows:

"In this week's forecast, we are forecasting a new event, named as STRAT_J, to occur during the period of January 21-January 27. STRAT_J looks to be a relatively weak event with multiple peaks. The associated cold air outbreaks will occur over both North American and Eurasian continents."

Every new stratospheric PULSE event issued is subject to continuously monitoring until it happens. On December 31, which is still more than 20 days before the occurrence of STRAT_J, the updated forecast data showed a much larger intensity of the STRAT_J PULSE event, as large as 1.1 trillion tons per day of mass transport into the polar stratosphere. The time window of the occurrence of the PULSE event kept unchanged, still January 21-January 27. The wave number 1 began to show large values during the entire forecasted time period of STRAT_J with the peak toward the later half of the forecasted time window of STRAT_J. The wave number 2 still showed two peaks, one around January 21 and the other one around January 28. The outputs of the second core component confirmed the forecasts of STRAT_J, because the probability of occurrence of stratospheric PULSE events among the sample forecasts made with initial condition of 50 days before STRAT_J to the date when the forecasts (December 31) were made increased to 35%. Therefore, in that week's forecasts, the timing did not change but the intensity of STRAT_J was upgraded to a very strong PULSE event and amplified the severity of the CAOs associated. It is recorded in the website archives that "STRAT_J (January 21-January 27) is expected to occur within the same time window as first forecasted on December 23. In this week's forecasts, we are upgrading the intensity of STRAT_J to be at least as strong as STRAT_H Associated with STRAT_J are continental-scale cold air outbreaks over both North American and Eurasian continents." Forecasts made in the following week (January 6) remained almost the same. In the forecasts made on January 14, 2 weeks prior to STRAT_J, the STRAT_J continuously occurred in the forecasts, though its intensity increased to 1.3 trillion tons per day. Overall, no change to the timing was made since December 23 and the intensity had not changed since December 31, which makes it a 30-day forecast for the timing and 20+ day forecast for the intensity of stratospheric PULSE events and associated CAOs.

Figure 11A:
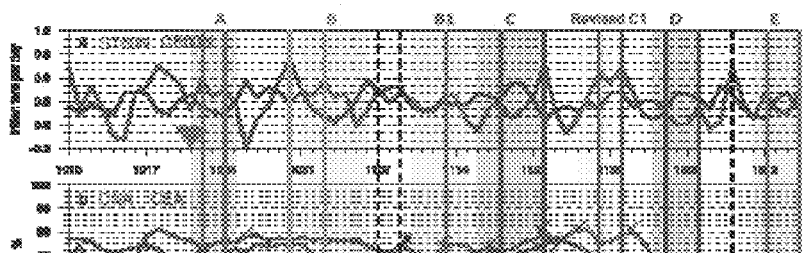
FIG. 11A is for the period from Oct. 10 to Dec. 15, 2015, illustrating the observed warm air mass transported into the polar stratosphere, namely the intensity indices of stratospheric mass circulation (ST60N, red curve, units: trillion tons per day), and the cold air mass transported out of the polar region near surface (CB60N, blue curve, units: 20 trillion tons per day), in accordance with an embodiment of the present invention, wherein forecasted PULSE events are labeled alphabetically, namely "A", "B" etc. Lightly color-shaded vertical boxes mark the range of occurrence dates of PULSE events predicted by the hybrid model with the issue date and lead time of forecasts marked under the boxes. The colored vertical lines mark the occurrence dates of individual peaks of the observed PULSE events that occurred within the range forecasted, while the dashed black lines marked those observed PULSE events that were not forecasted. Check marks and cross marks indicate CAO events that were forecasted successfully and unsuccessfully (or not forecasted), respectively.
Figure 11B:
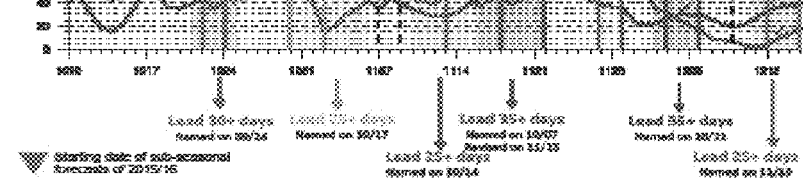
FIG. 11B is for the period from Oct. 10 to Dec. 15, 2015, illustrating the observed cold area indices (units: %) measuring the percentage area occupied by below-normal surface temperatures over mid-latitude region of North America (CNA, blue curve) and Eurasia (CEA, red curve), in accordance with an embodiment of the present invention. The forecasted PULSE events are labeled alphabetically, namely "A", "B" etc. Lightly color-shaded vertical boxes mark the range of occurrence dates of PULSE events predicted by the hybrid model with the issue date and lead time of forecasts marked under the boxes. The colored vertical lines mark the occurrence dates of individual peaks of the observed PULSE events that occurred within the range forecasted, while the dashed black lines marked those observed PULSE events that were not forecasted. Check marks and cross marks indicate CAO events that were forecasted successfully and unsuccessfully (or not forecasted), respectively.
Figure 11C:
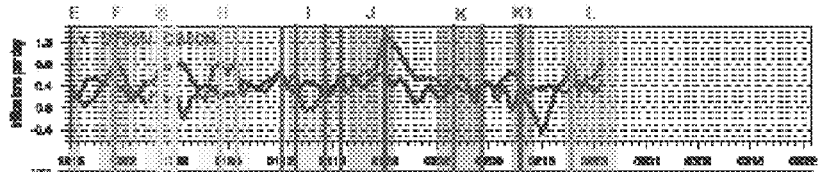
FIG. 11C is for the period from Dec. 15, 2015 to date, illustrating the observed warm air mass transported into the polar stratosphere, namely the intensity indices of stratospheric mass circulation (ST60N, red curve, units: trillion tons per day), and the cold air mass transported out of the polar region near surface (CB60N, blue curve, units: 20 trillion tons per day), in accordance with an embodiment of the present invention, wherein forecasted PULSE events are labeled alphabetically, namely "A", "B" etc. Lightly color-shaded vertical boxes mark the range of occurrence dates of PULSE events predicted by the hybrid model with the issue date and lead time of forecasts marked under the boxes. The colored vertical lines mark the occurrence dates of individual peaks of the observed PULSE events that occurred within the range forecasted, while the dashed black lines marked those observed PULSE events that were not forecasted. Check marks and cross marks indicate CAO events that were forecasted successfully and unsuccessfully (or not forecasted), respectively.
Figure 11D:
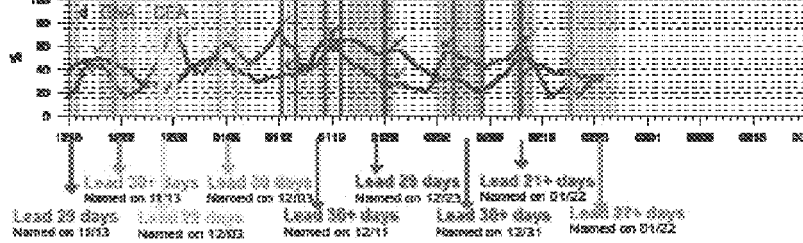
FIG. 11D is for the period from Dec. 15, 2015 to date, illustrating the observed cold area indices (units: %) measuring the percentage area occupied by below-normal surface temperatures over mid-latitude region of North America (CNA, blue curve) and Eurasia (CEA, red curve), in accordance with an embodiment of the present invention. The forecasted PULSE events are labeled alphabetically, namely "A", "B" etc. Lightly color-shaded vertical boxes mark the range of occurrence dates of PULSE events predicted by the hybrid model with the issue date and lead time of forecasts marked under the boxes. The colored vertical lines mark the occurrence dates of individual peaks of the observed PULSE events that occurred within the range forecasted, while the dashed black lines marked those observed PULSE events that were not forecasted. Check marks and cross marks indicate CAO events that were forecasted successfully and unsuccessfully (or not forecasted), respectively.

As shown in the red curve in upper panel of FIG. 11A, STRAT_J turned out to have twin-peaks at January 20 and January 27, respectively. The second peak (January 27) is much larger, transporting more than 1.2 trillion tons of warm air into the polar stratosphere per day, almost the same as the forecasts of peak intensity made on December 31. The two peaks are expected to correspond well to the intensified cold air mass transported out the polar region near surface (blue curve in upper panel of FIG. 11A). The peak on January 20, mainly driven by stronger wave number 2, corresponded to massive CAOs over both North America and Eurasian continents in the period January 17-January 24. This peak of STRAT_J corresponded to the winter storm over eastern United States and super CAOs over Eurasia. The second peak, occurred on January 27, was driven by stronger activities of both wave number 1 and 2, bringing another round of CAOs over both continents.

To sum up the forecast skill for STRAT_J, shown in the exemplary embodiment, the timing of the STRAT_J event was successfully forecasted up to 29 days in advance; the intensity was successfully forecasted up to 22 days in advance; the attribution to wave number 1 components in terms of both timing and intensity was captured at a forecast lead time of 22 days; the timing of wave number 2 components was captured at a long forecast lead time of 29 days, but its intensity was faithfully forecasted at a slightly shorter forecast lead time of two weeks. Therefore, the CFSv2 indeed has useful skills in predicting all the temporal and spatial information about the STRAT_J 20-30 days in advance. The forecasts of the timing and location of the continental-scale CAOs were successful based on the successfully forecasted STRAT_J event and its statistically robust and physically direct relationship As recorded in the website www.amccao.com and summarized in FIG. 11, the hybrid model was very successful in forecasting CAOs at a lead time of 3□6 weeks in advance in the 2015□16 winter season. Specifically, from September 24 till February 25, 16 forecasts of PULSE events in the stratospheric mass circulation in the period from Oct. 21, 2015 to Mar. 18, 2016 have been issued, and 14 forecasts have been materialized. None of the forecasts issued as a result of the hybrid model resulted in a false-alarm forecast and all of the forecasts have been confirmed to capture the peak times of these 15 PULSEs within the time periods of their forecasts. The average forecast lead time is 30 days except a revised event (STRAT_C1). Only one PULSE event with two peaks in the period November 6-November 10 was not forecasted.

Moreover, all forecasted strong stratospheric circulation events (or PULSE events) were associated with CAOs over at least one of the two major continents within few days around the peak times as well, covering a total of 29 rounds of CAOs so far. This is particularly the case for North America where an abrupt increase of the area of below-normal temperatures was recorded within a few days after each of the 14 PULSEs. Only 1 round of CAOs related to the PULSE event at that time was "missed", which was missed in the forecasts.

In another exemplary embodiment, the maps of probability of cold surface temperature anomalies and ensemble mean surface temperature anomalies over both North America and Eurasia continents in the vicinity of forecasted stratospheric PULSE events since December 2 were experimentally forecasted using the hybrid model, though not all of them were fully published on the website. Here the performance of the hybrid model in predicting the spatial pattern of ensemble mean surface air temperature anomalies associated with the strongest PULSE event so far, STRAT_E, is presented.

STRAT_E was first forecasted on Dec. 3, 2017 to occur in the time range of Jan. 8-Jan. 13, 2017 with a peak around January 8. In the forecasts, more details were provided about this event: "We believe STRAT_E is going to be a very strong event with a peak net mass transport into the polar stratosphere over 1.0 trillion tons per day". Such forecasts made about 1 month ahead have been verified. The observed STRAT_E indeed peaked on January 9 with a peak net mass transport into the polar stratosphere about 1.1 trillion tons per day. STRAT_E is a high-impact event. Associated with STRAT_E are the winter storm Jupiter, which caused ice storm to parts of the Plains and Midwest of US, and the winter storm Egon, which brought chaotic winter weather to Europe.

Figure 12:
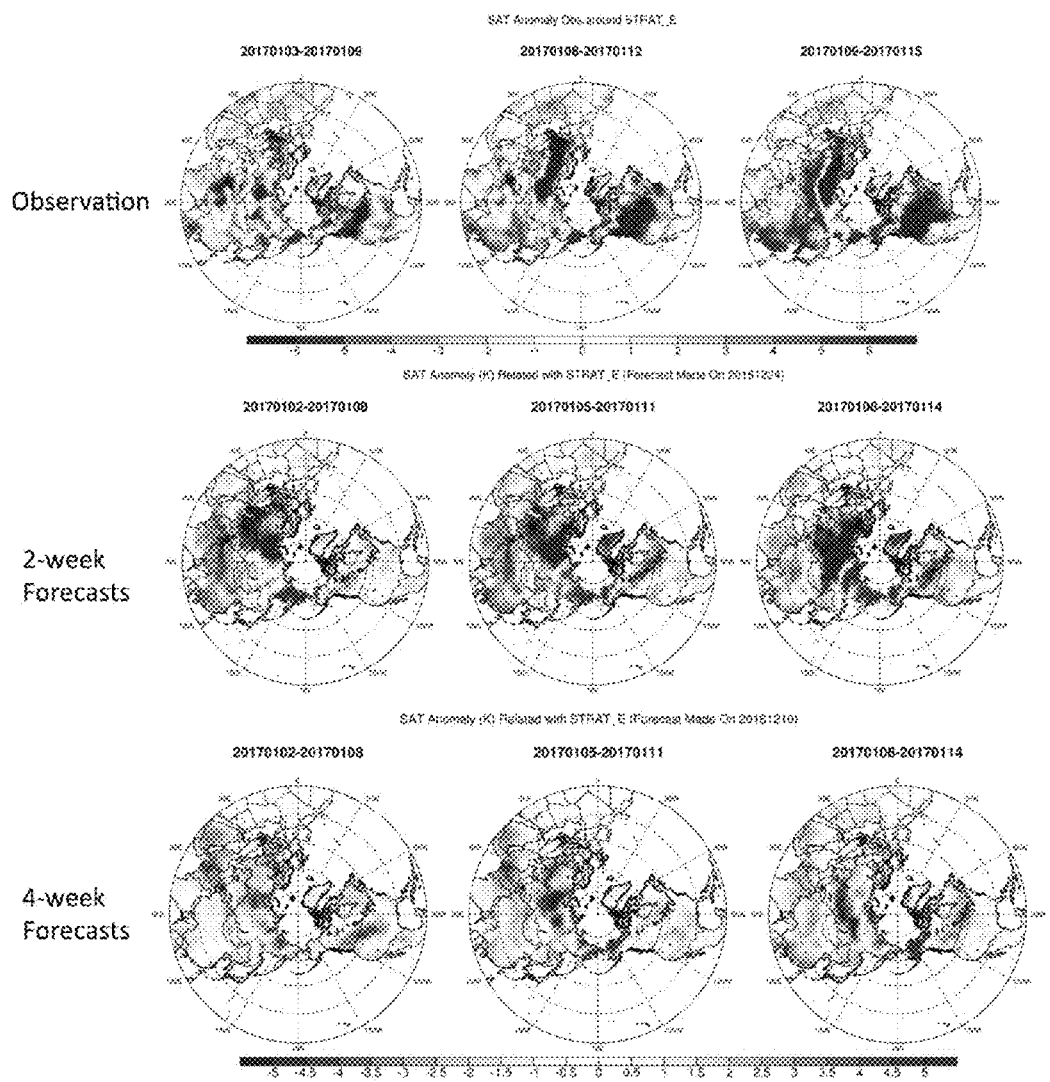
FIG. 12 illustrates of surface air temperature anomalies (units: K) in the week before, during, and after the peak date of STRAT_E event, in accordance with an embodiment of the present invention, wherein the $1^{st}$ row are for observations, and $2^{nd}$ and $3^{rd}$ rows are for forecasts made at a forecast lead time of 2 and 4 weeks, respectively. The peak date of STRAT_E for observations is January 9, while the forecasted peak date is January 8.

Observed maps of surface air temperature anomalies before, during, and after the peak dates of STRAT_E event are displayed in the 1st row of FIG. 12. It has 6 main features: (i) cold anomalies over the entire North America except Florida; (ii) cold anomalies in the northern latitudes of Asia; (iii) cold anomalies over Europe; (iv) slightly below-normal surface air temperature over the northern part of Africa; (v) anomalously warm in most areas of mid-latitudes of Asia; and in addition, (vi) the warmth over mid-latitude Asia and cold over North America showed a clear intensification from the week before to the week after peak date of STRAT_E. Comparing the observed maps with the forecasted maps of ensemble mean surface air temperature anomalies at forecast lead times of 2 weeks and 4 weeks (the $2^{nd}$ and $3^{rd}$ rows of FIG. 12 respectively), it is noticed that the 2-week forecasts successfully captured the all the 6 features found in the observations, despite that the cold anomalies over North America and Europe are slightly under-estimated, while the cold area over northern part of Asia is forecasted more southward. The 4-week forecasts, which are far beyond the predictability of dynamical model, are still similar to observations.

As such, in various embodiments, the present invention provides a system and method for predicting continental-scale cold air masses. The linkage of the occurrence probability of continental-scale cold air outbreaks (CAOs) to the amount of air mass transported into the polar stratosphere, which can be predicted by the NOAA-CFSv2 4-6 weeks ahead, suggests that it is feasible to predict continental-scale CAOs one-month in advance.

The present invention may be embodied on various computing platforms that perform actions responsive to software-based instructions. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Python, MATLAB or the like and conventional procedural programming languages, such as the "C" programming language or similar programming languages, or assembly language.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosures of all publications cited above are expressly incorporated herein by reference, each in its entirety, to the same extent as if each were incorporated by reference individually.

It is also to be understood that the following claims are intended to cover all of the generic and specific features of the invention herein described, and all statements of the scope of the invention which, as a matter of language, might be said to fall there between.

What is claimed is:

1. A method for generating sub-seasonal forecasts of winter snowstorms and cold air outbreaks (CAOs), the method comprising:
    receiving, by at least one computing device, a plurality of forecasts generated by an operational numerical model for seasonal weather forecasts;
    deriving a lead-time series of a set of forecasted indices describing a state of stratospheric mass circulation from the plurality of forecasts generated by an operational numerical model for seasonal weather forecasts;
    detecting a timing of occurrence and associated intensity of one or more PULSE events in the lead-time series of the set of forecasted indices describing the state of stratospheric mass circulation to determine a model forecasted state of the stratospheric mass circulation during the detected PULSE events;
    correcting a model forecast bias of the model forecasted state of the stratospheric mass circulation during the detected PULSE events to generate a corrected model forecasted state of the stratospheric mass circulation during the detected PULSE events;
    constructing a statistical model linking the corrected model forecasted state of the stratospheric mass circulation during the detected PULSE events to surface temperature and wintery precipitation based on historical observation data; and
    generating a sub-seasonal forecast of winter snowstorms and cold air outbreaks (CAOs) by applying the corrected model forecasted state of the stratospheric mass circulation during the detected PULSE events to the statistical model.

2. The method of claim 1, wherein a PULSE event is detected when a time period having a high probability of a local peak in the lead-time series of the set of forecasted indices describing the state of stratospheric mass circulation is forecasted by large number of ensemble m embers.

3. The method of claim 1, wherein the operational numerical model for seasonal weather predictions is a model representing the global interaction between the Earth's oceans, land and atmosphere.

4. The method of claim 1, wherein the operational numerical model for seasonal weather predictions can be selected from one of a plurality of operational forecast models, including the NOAA (National Oceanic and Atmospheric Administration) Climate Forecast System (CFSv2).

5. The method of claim 1, wherein the lead-time series of a set of forecasted indices describing a state of stratospheric mass circulation includes one or more of mass circulation intensity, duration, spatial scales, longitude locations of maximum poleward and equatorward mass transport and detailed spatial pattern.

6. The method of claim 1, wherein a lead time of the lead-time series of a set of forecasted indices describing a state of stratospheric mass circulation is about 0-60 days.

7. The method of claim 1, wherein constructing a statistical model linking the corrected model forecasted state of the stratospheric mass circulation during the detected PULSE events to surface temperature and wintery precipitation based on historical observation data, comprises performing one or more statistical analysis methods, selected from a singular vector decomposition, a canonical correlation analysis, and a constructed analogue.

8. The method of claim 1, wherein the sub-seasonal forecast of winter snowstorms and cold air outbreaks (CAOs) is at a forecast range between about 14 days and about 50 days.

9. The method of claim 1, wherein the sub-seasonal forecast of winter snowstorms and cold air outbreaks (CAOs) further comprises a timing of occurrence associated the winter snowstorms and CAOs, an intensity associated with the winder snowstorms and CAOs, and map information of one or more cold temperature anomalies associated with the winter snowstorms and CAOs.

10. The method of claim 1, wherein generating a sub-seasonal forecast of winter snowstorms and cold air outbreaks (CAOs) by applying the corrected model forecasted state of the stratospheric mass circulation during the detected PULSE events to the statistical model further comprises, generating one or more of, a time series and a temporally evolving maps of temperature and precipitation anomalies for a period from 1-2 weeks before, to after a detected PULSE event, at lead times between 14 days to 50 days.

11. A computer system for generating sub-seasonal forecasts of winter snowstorms and cold air outbreaks (CAOs), the system including one or more of a central processing unit (CPU), a computer readable memory, a computer readable storage medium and one or more program instructions operable for:

receiving a plurality of forecasts generated by an operational numerical model for seasonal weather forecasts;

deriving a lead-time series of a set of forecasted indices describing a state of stratospheric mass circulation front the plurality of forecasts generated by an operational numerical model for seasonal weather forecasts;

detecting a timing of occurrence and associated intensity of one or more PULSE events in the lead-time series of the set of forecasted indices describing the state of stratospheric mass circulation to determine a model forecasted state of the stratospheric mass circulation during the detected PULSE events;

correcting a model forecast bias of the model forecasted state of the stratospheric mass circulation during the detected PULSE events to generate a corrected model forecasted state of the stratospheric mass circulation during the detected PULSE events;

constructing a statistical model linking the corrected model forecasted state of the stratospheric mass circulation during the detected PULSE events to surface temperature and wintery precipitation based on historical observation data; and generating a sub-seasonal forecast of winter snowstorms and cold air outbreaks (CAOs) by applying the corrected model forecasted state of the stratospheric mass circulation during the detected PULSE events to the statistical model.

12. The system of claim 11, wherein a PULSE event is detected when a time period having a high probability of a local peak in the lead-time series of the set of forecasted indices describing the state of stratospheric mass circulation is forecasted by large number of ensemble members.

13. The system of claim 11, wherein the operational numerical model for seasonal weather predictions can be selected from one of a plurality of operational forecast models, including the NOAA (National Oceanic and Atmospheric Administration) Climate Forecast System (CFSv2).

14. The system of claim 11, wherein the lead-time series of a set of forecasted indices describing a state of stratospheric mass circulation includes one or more of mass circulation intensity, duration, spatial scales, longitude locations of maximum poleward and equatorward mass transport and detailed spatial pattern.

15. The system of claim 11, wherein the sub-seasonal forecast of winter snowstorms and cold air outbreaks (CAOs) is at a forecast range between about 14 days and about 50 days.

16. The system of claim 11, wherein the sub-seasonal forecast of winter snowstorms and cold air outbreaks (CAOs) further comprises a timing of occurrence associated the winter snowstorms and CAOs, an intensity associated with the winder snowstorms and CAOs, and map information of one or more cold temperature anomalies associated with the winter snowstorms and CAOs.

17. The system of claim 11, wherein generating a sub-seasonal forecast of winter snowstorms and cold air outbreaks (CAOs) by applying the corrected model forecasted state of the stratospheric mass circulation during the detected PULSE events to the statistical model further comprises, generating one or more of, a time series and a temporally evolving maps of temperature and precipitation anomalies for a period from 1-2 weeks before, to after a detected PULSE event, at lead times between 14 days to 50 days.

18. A computer program product for generating sub-seasonal forecasts of winter snowstorms and cold air outbreaks (CAOs), the computer program product comprising, a computer-readable medium having non-transitory program code recorded thereon, the computer program product comprising:

program code to receive a plurality of forecasts generated by an operational numerical model for seasonal weather forecasts;

program code to derive a lead-time series of a set of forecasted indices describing a state of stratospheric mass circulation from the plurality of forecasts generated by an operational numerical model for seasonal weather forecasts;

program code to detect a timing of occurrence and associated intensity of one or more PULSE events in the lead-time series of the set of forecasted indices describing the state of stratospheric mass circulation to determine a model forecasted state of the stratospheric mass circulation during the detected PULSE events;

program code to correct a model forecast bias of the model forecasted state of the stratospheric mass circulation during the detected PULSE events to generate a corrected model forecasted state of the stratospheric mass circulation during the detected PULSE events;

program code to construct a statistical model linking the corrected model forecasted state of the stratospheric mass circulation during the detected PULSE events to surface temperature and wintery precipitation based on historical observation data; and program code to generate a sub-seasonal forecast of winter snowstorms and cold air outbreaks (CAOs) by applying the corrected model forecasted state of the stratospheric mass circulation during the detected PULSE events to the statistical model.

19. The computer program product of claim 18, wherein a PULSE event is detected when a time period having a high probability of a local peak in the lead-time series of the set of forecasted indices describing the state of stratospheric mass circulation is forecasted by large number of ensemble members.

20. The computer program product of claim 18, wherein the operational numerical model for seasonal weather predictions can be selected from one of a plurality of operational forecast models, including the NOAA (National Oceanic and Atmospheric Administration) Climate Forecast System (CFSv2).

21. The computer program product of claim 18, wherein the lead-time series of a set of forecasted indices describing a state of stratospheric mass circulation includes one or more of mass circulation intensity, duration, spatial scales, longitude locations of maximum poleward and equatorward mass transport and detailed spatial pattern.

22. The computer program product of claim 18, wherein the sub-seasonal forecast of winter snowstorms and cold air outbreaks (CAOs) is at a forecast range between about 14 days and about 50 days.

23. The computer program product of claim 18, wherein the program code to generate the sub-seasonal forecast of winter snowstorms and cold air outbreaks (CAOs) comprises a timing of occurrence associated the winter snowstorms and CAOs, an intensity associated with the winder snowstorms and CAOs, and map information of one or more cold temperature anomalies associated with the winter snowstorms and CAOs.

24. The computer program product of claim 18, wherein the program code to generate a sub-seasonal forecast of winter snowstorms and cold air outbreaks (CAOs) by applying the corrected model forecasted state of the stratospheric mass circulation during the detected PULSE events to the statistical model further comprises, program code to generate one or more of, a time series and a temporally evolving maps of temperature and precipitation anomalies for a period from 1-2 weeks before, to after a detected PULSE event, at lead times between 14 days to 50 days.

* * * * *

UNITED STATES PATENT AND TRADEMARK OFFICE
CERTIFICATE OF CORRECTION

PATENT NO. : 10,197,706 B1
APPLICATION NO. : 15/450897
DATED : February 5, 2019
INVENTOR(S) : Ming Cai et al.

It is certified that error appears in the above-identified patent and that said Letters Patent is hereby corrected as shown below:

In the Claims

Column 28, Claim 2, Line 15 should read:
is forecasted by large number of ensemble members.

Column 28, Claim 9, Line 52 should read:
with the winter snowstorms and CAOs, and map informa- Column 29, Claim 11, Line 7 should read:
describing a state of stratospheric mass circulation from Column 29, Claim 16, Line 55 should read:
with the winter snowstorms and CAOs, and map informa- Column 30, Claim 23, Line 62 should read:
storms and CAOs, an intensity associated with the winter Signed and Sealed this
Seventh Day of May, 2019

Andrei Iancu
*Director of the United States Patent and Trademark Office*